US012558813B2

(12) United States Patent
Alva

(10) Patent No.: US 12,558,813 B2
(45) Date of Patent: Feb. 24, 2026

(54) MACHINE FOR HYBRID CUTTING, PREPARING AND FINISHING A SLAB WITH FINISHED FACE DOWN AND RELATED METHOD

(71) Applicant: POSEIDON INDUSTRIES, INC., Punta Gorda, FL (US)

(72) Inventor: Jose Antonio Alva, North Port, FL (US)

(73) Assignee: POSEIDON INDUSTRIES, INC., Punta Gorda, FL (US)

( * ) Notice: Subject to any disclaimer, the term of this patent is extended or adjusted under 35 U.S.C. 154(b) by 424 days.

(21) Appl. No.: 18/352,301

(22) Filed: Jul. 14, 2023

(65) Prior Publication Data

US 2025/0018603 A1 Jan. 16, 2025

(51) Int. Cl.
*B28D 1/00* (2006.01)
*B28D 7/00* (2006.01)
*B28D 7/04* (2006.01)

(52) U.S. Cl.
CPC ............ *B28D 1/003* (2013.01); *B28D 7/005* (2013.01); *B28D 7/046* (2013.01)

(58) Field of Classification Search
None
See application file for complete search history.

(56) References Cited

U.S. PATENT DOCUMENTS

| | | | | |
|---|---|---|---|---|
| 6,006,735 | A | 12/1999 | Schlough et al. | |
| 7,241,981 | B2 | 7/2007 | Hofmann | |
| 8,365,715 | B2 | 2/2013 | Toncelli | |
| 8,528,536 | B2 | 9/2013 | Jacobsson et al. | |
| 9,409,242 | B2 | 8/2016 | Guazzoni | |
| 9,533,430 | B1 | 1/2017 | Kalb | |
| 10,607,332 | B2 | 3/2020 | Olson et al. | |
| 2003/0118229 | A1 * | 6/2003 | Andrews | B23Q 35/128 382/141 |
| 2006/0016957 | A1 * | 1/2006 | Hofmann | A43D 95/14 250/201.1 |
| 2013/0055550 | A1 * | 3/2013 | Guazzoni | B23D 45/027 125/35 |
| 2017/0252945 | A1 * | 9/2017 | Traini | B24B 7/224 |
| 2020/0180101 | A1 * | 6/2020 | Murata | B24B 7/228 |
| 2022/0395947 | A1 * | 12/2022 | Pickering | B23Q 3/15713 |
| 2023/0019907 | A1 | 1/2023 | Mantenuto | |

OTHER PUBLICATIONS

U.S. Appl. No. 18/327,101, filed Jun. 1, 2023 Inventor: Jose Antonio Alva.
U.S. Appl. No. 18/352,308, filed Jul. 14, 2023 Inventor: Jose Antonio Alva.

* cited by examiner

*Primary Examiner* — Joel D Crandall
*Assistant Examiner* — Jason Khalil Hawkins
(74) *Attorney, Agent, or Firm* — ALLEN, DYER, DOPPELT + GILCHRIST, P.A.

(57) ABSTRACT

A machine processes a slab that is positioned with the finished face down on vacuum pods on a work table. The side edges of the slab are cut with the slab upside by following a mirror imaged slab cut layout to form a slab corresponding substantially to the shape of a countertop. Without removing the cut slab from the vacuum pods and maintaining the finished face down, the machine routes a sink hole using a finger bit that had been switched onto the spindle, the routing path based upon the mirror imaged slab cut layout. The slab is finished by forming an edge profile on the inside of any sink holes and edging and polishing the sides of the finished slab.

8 Claims, 21 Drawing Sheets

MACHINE FOR HYBRID CUTTING, PREPARING AND FINISHING A SLAB WITH FINISHED FACE DOWN AND RELATED METHOD

FIELD OF THE INVENTION

The present invention relates to the field of stone processing, and more particularly, this invention relates to processing a stone or a stone-like slab by cutting the slab with finished face down and associated method.

BACKGROUND OF THE INVENTION

A stone or stone-like slab is commonly used in building construction. For example, granite, quartz, marble, soapstone, engineered stone, and other quarry stones are often selected for use as flooring, tables, countertops, and kitchen sinks. These stone slabs may also be formed from a combination of natural and synthetic materials and include binders, and have improved qualities and aesthetic characteristics, reproducibility, and stain-resistant or heat-resistant properties. Stone slabs usually have certain features that must be taken into account during processing, which includes cutting and fabrication, especially for counter tops, kitchen sinks, and other end-use applications that require high aesthetic consideration.

For example, the stone slabs may have grain, i.e., vein patterns, that dictate the desired positioning of a countertop or similar product to be cut from the stone. The countertop may be more aesthetically pleasing if the grain pattern extends in a certain direction. Other cut sections from the same or similar stone slab that are arranged in the same location in the home should match the vein pattern.

Cutting the outline of the slab and cutting any sink holes, cut-outs, or other slab details is important and requires precision cutting. Many vendors employ a three axis cutting machine having a circular saw blade. These machines are often used in the industry to cut the outer perimeter of the slab, followed by cutting sink holes using the circular saw blade. The slab outline may be initially cut, and then manually repositioned for sink hole cutting.

Sometimes the cutting tool is a router or finger bit that may be used with repeated cutting passes to gradually cut a sink hole. This is a slow process since repeated passes are made with each router pass making a deeper cut into the slab. To alleviate the slow processing time associated with normal finger bit cutting, the circular saw blade is employed instead of a router bit, but even then there are usually issues with circular blade cutting since it may not be possible to make accurate deep cuts since the blade runs into the table surface during cutting, creating friction, drag and heat. For this reason, sink hole cutting on stone slabs and similar slab cutting is challenging when the aesthetic considerations of the slab are taken into consideration and accurate and clean cuts are required, without unduly slowing the slab processing into a finished product.

Currently, the industry standard for fabrication of kitchen countertops, made of natural stone (granite, quartz, marble, travertine, quartzite, or porcelain), is divided into three phases. In the first phase of cutting, the basic shape of a custom kitchen countertop is cut out of a slab of stone, which typically is about 2-3 centimeters thick and usually about 120 inches by about 60 inches. The industry standard solution at the first phase is a remote controlled bridge saw, or a handsaw, or a CNC bridge saw or CNC saw jet. These methods require one laborer.

The second phase in fabrication of the countertop is preparation. Once the slab shapes have been removed from the saw table, no matter which method is used to cut them, it must have radius and sink cut-outs (holes) done by hand or by a CNC router. This phase is called preparation because it is finalizing the two-dimensional shaping of all countertops before moving to the "edging/finishing" stage.

The third phase as edging finishing requires placing the edge profile on the inside of the sink holes and the exterior edging and polishing. This is currently accomplished by a secondary laborer aside from a cutter, for forming the phase one cutting. This part may also be performed by a laborer by hand or an operator who will perform this with a CNC router.

These three phases are labor intensive and time consuming and improvements have been long desired in the industry, but the technical achievement has not been realized.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

In general, a machine for processing a stone or a stone-like slab having rough cut side edges and a finished face and bottom surface may comprise a frame defining a slab processing area in which the slab to be processed extends along an X and Y coordinate axis. A work table is positioned at the slab processing area and includes vacuum pods on the work table on which the slab is positioned with the finished face down for cutting, routing and finishing. The slab is oriented with a mirror imaged slab cut layout that is based upon a slab cut layout on the finished face of the slab. A bridge is supported for movement on the frame across the slab processing area. A carriage is mounted on the bridge. The carriage is configured for vertical movement along a Z coordinate axis and horizontal movement on the bridge to define movement of a lower end of the carriage along the X, Y and Z coordinate axes.

A machine yoke is rotatably mounted at the lower end of the carriage and configured for C-axis rotation. The machine yoke may comprise opposing support arms. A machining head is rotatably mounted between the support arms and configured for A axis rotation. The machining head may comprise a spindle configured to mount a circular saw blade, a finger bit or at least one finishing tool for respective cutting, routing or finishing on the slab when positioned upside down on the vacuum pods. At least one drive mechanism is connected to the bridge, carriage, machine yoke and machining head.

A controller may be connected to the at least one drive mechanism and configured to control movement of the bridge, carriage, machine yoke and machining head when the spindle supports a circular saw blade to cut the side edges of the slab upside down by following the mirror imaged slab cut layout to form a slab corresponding substantially to the shape of a countertop. Without removing the cut slab from the vacuum pods and maintaining the finished face down, the machine routes any sink holes and any radius curves on the finished slab using a finger bit that had been switched onto the spindle after removal of the circular saw blade, the routing path being based upon the mirror imaged slab cut layout, and finish the slab by forming an edge profile on the inside of any sink holes and edging and polishing the sides of the finished slab.

The controller may be configured to generate a digital slab cut layout file containing digital data representative of the cut layout on the finished face of the slab, and mirror image the digital slab cut layout file to form the mirror imaged slab cut layout. In another example, a laser projector is connected to the controller, which is configured to project the mirror imaged slab cut layout from the laser projector towards the work table to aid in positioning the slab for mirror image cutting with the finished face down on the vacuum pods. The controller may also be configured to overlay a slab cut layout on a digital image of the finished face of the slab, generate a Drawing Exchange Format (DXF) file containing digital data representative of the finished face and its slab cut layout referenced to reference markers adhered on the rough cut side edges of the slab, mirror image the DXF file, and laser project the mirror imaged locations of the reference markers.

In another example, the controller may be configured rotate the machine yoke and maintain a support arm leading along the path of advancement of the finger bit to relieve stress on the A-axis when routing any sink holes and radius curves. The controller may also be configured to switch out the finger bit with at least one finishing tool for forming the edge profile and edging and polishing the sides of the slab. The controller may be configured to rout sink anchor holes while the slab is positioned on the vacuum pods. The sink anchor holes may be configured to receive anchors for sink mounting. In an example, the work table may comprise a quartz slab.

A method of processing a stone or a stone-like slab having rough cut side edges and a finished face and bottom surface may comprise positioning the slab with the finished face down on vacuum pods positioned on a work table and oriented with a mirror imaged slab cut layout that is based upon a slab cut layout on the finished face of the slab, and cutting with a circular saw blade mounted on a spindle the side edges of the slab upside down by following the mirror imaged slab cut layout to form a slab corresponding substantially to the shape of a countertop. Without removing the cut slab from the vacuum pods and maintaining the finished face down, the method includes routing any sink holes and any radius curves on the finished slab piece using a finger bit that had been switched onto the spindle after removal of the circular saw blade, the routing path based upon mirror imaged slab cut layout, and finishing the finished slab by forming an edge profile on the inside of any sink holes and edging and polishing the sides of the finished slab.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
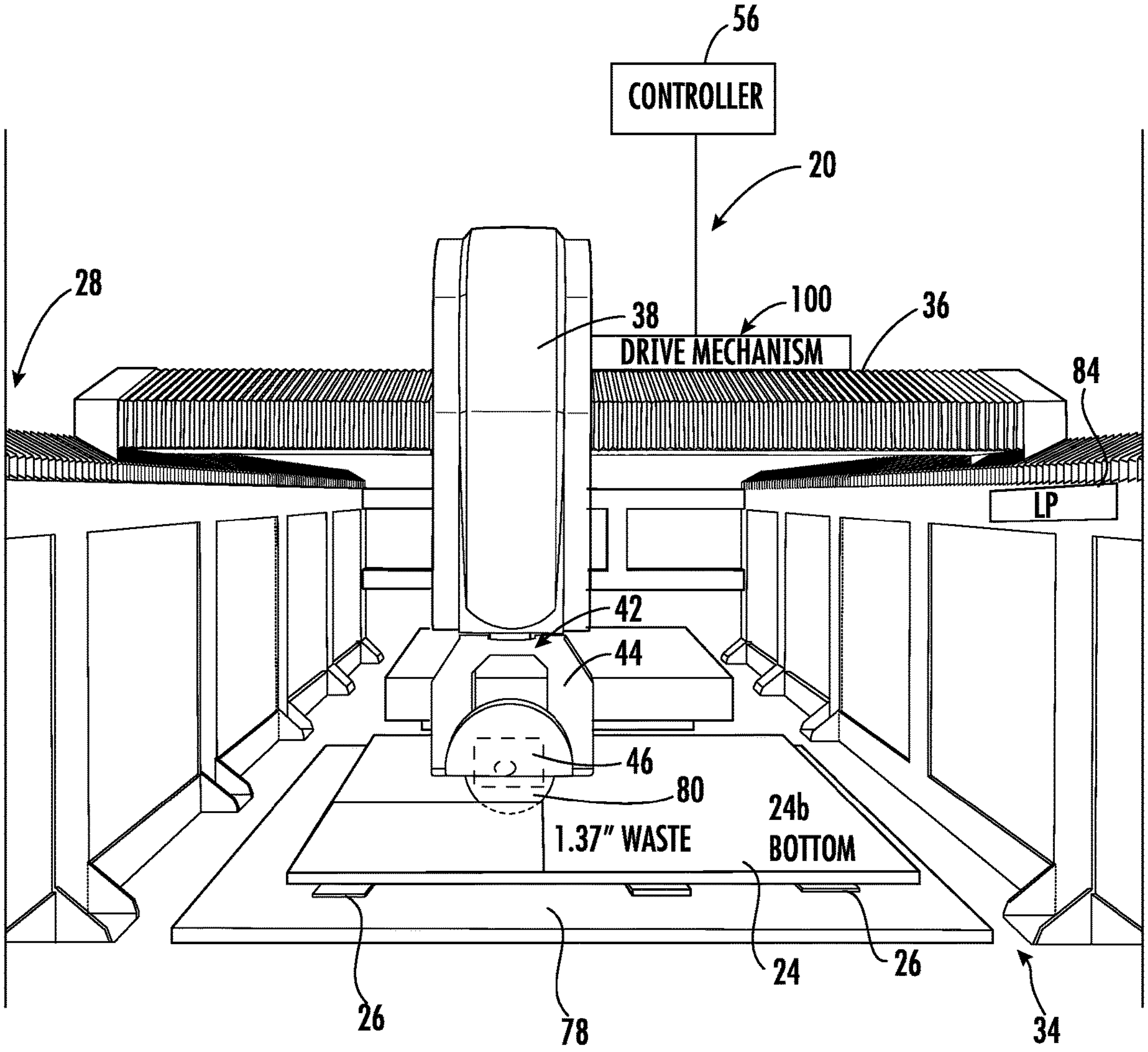
FIG. 1 is a schematic, isometric view of the machine showing a slab being cut with finished face down on raised vacuum pods and showing minimal waste in accordance with the invention.
Figure 2:
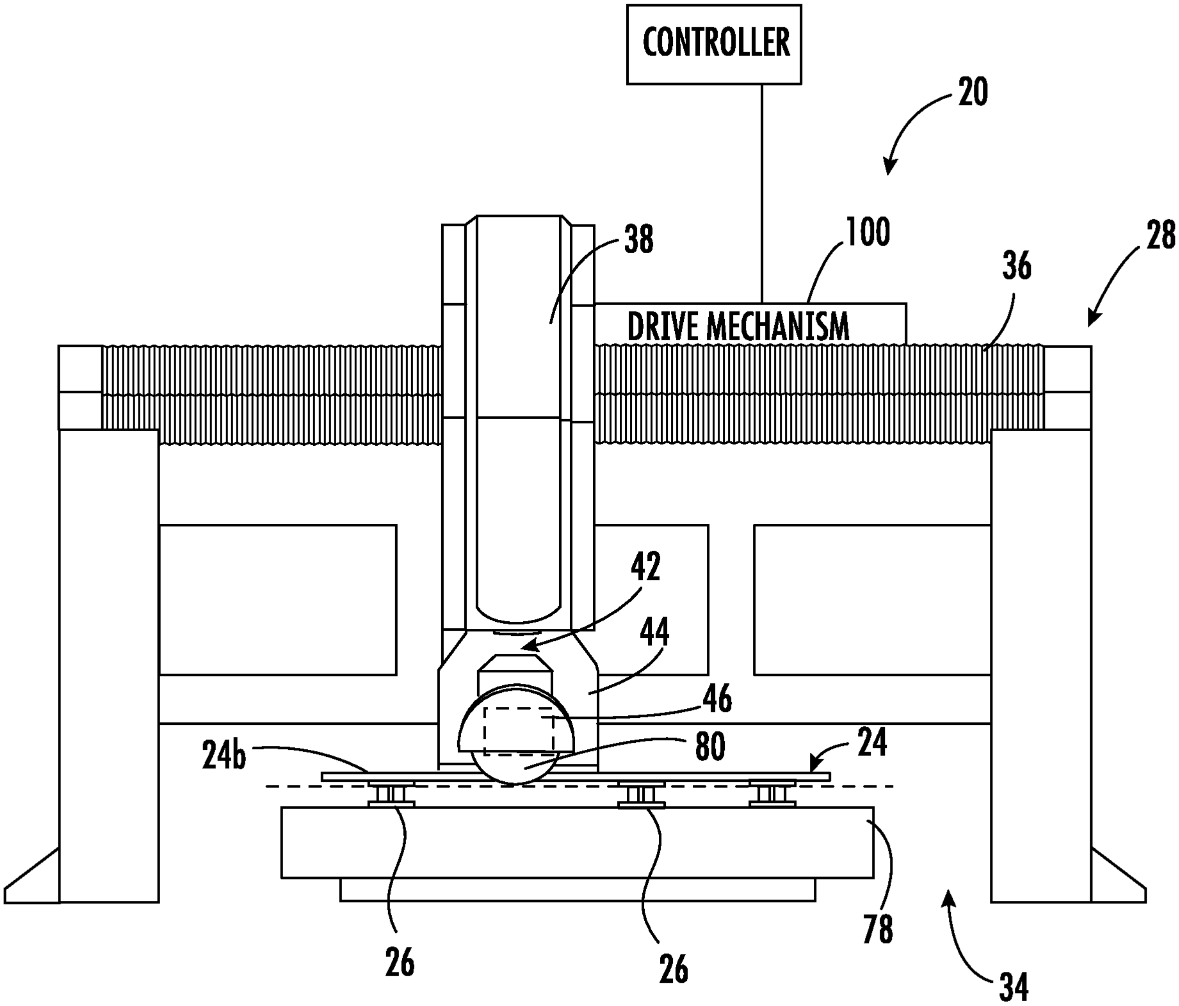
FIG. 2 is a side elevation view of the machine of FIG. 1.
Figure 5:
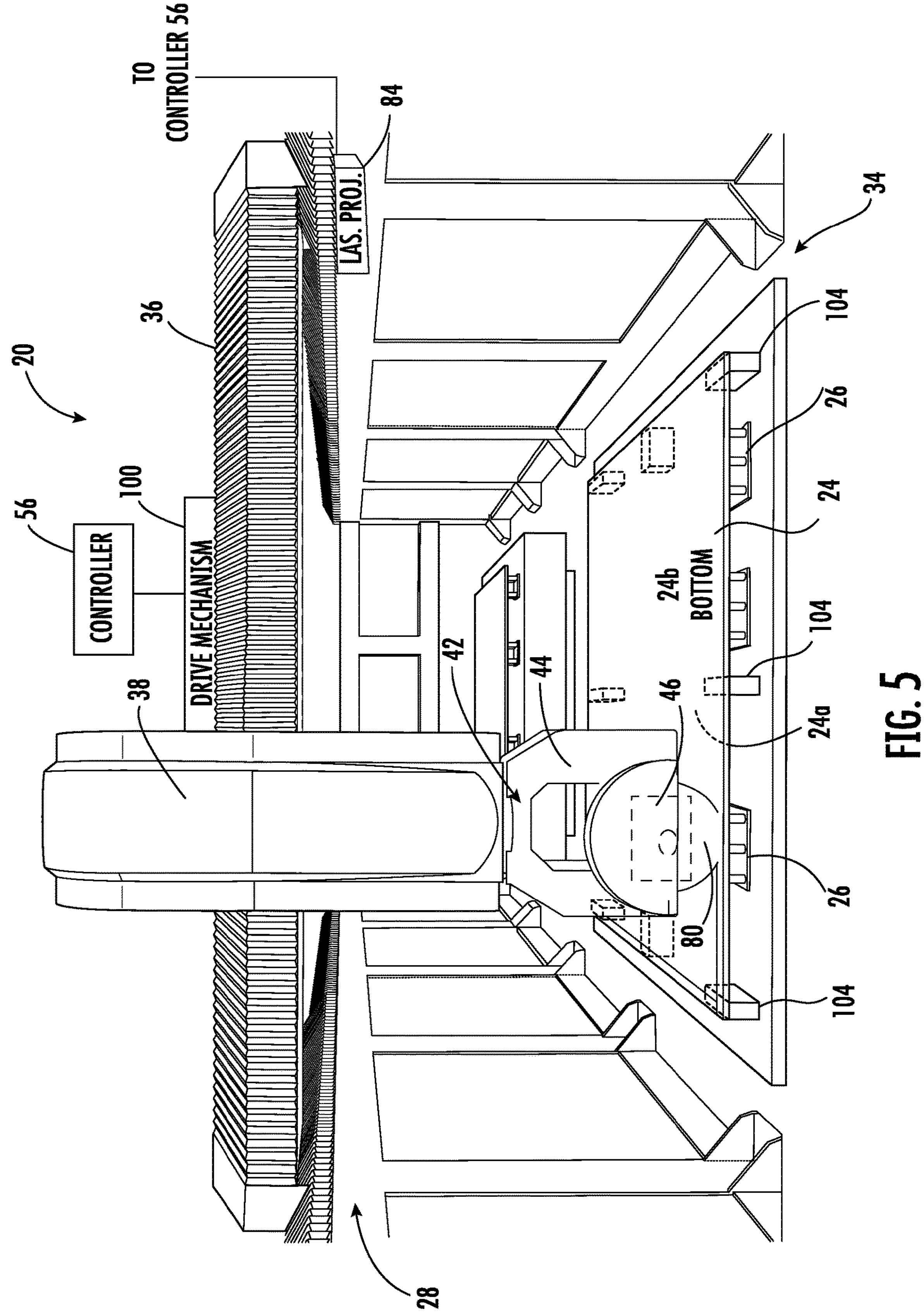
FIG. 5 is another schematic, isometric view of the machine as in FIG. 1 showing relief supports positioned on the work table under the side edges.

An example of the machine for processing a stone or a stone-like slab having side edges and a finished face and bottom surface is illustrated generally at FIGS. 1, 2 and 5 and configured as a 5-axis machining center for slab processing. Reference numerals identifying components of the machine in these figures are the same as described in the description of the machine at FIG. 7 where a more detailed description of the machine components and their function is described. The machine 20 allows Phase 1 cutting to be completed when a slab 24 is positioned upside down with the finished face 24*a* down. A laser projector 84 may project a laser optical beam towards the work table 78 to position the slab 24 upside down on the work table 78 as will be explained in further detail below. The machine 20 cuts the pieces of the slab 24 to measurement.

The upside down cutting allows tighter nesting because overcuts are shorter due to a deeper plunge of the circular saw blade 80. There is also a reduced table maintenance because the circular saw blade 80 cuts through the stone in the air as shown in FIGS. 1 and 2, where the slab 24 is raised from the work table because the slab is positioned on vacuum pods 26. The slab is not on top of a substrate 79 for the work table as shown in FIGS. 3 and 4, where a deep plunge is not possible and the blade 80 encounters friction against the substrate when cutting.

Figure 3:
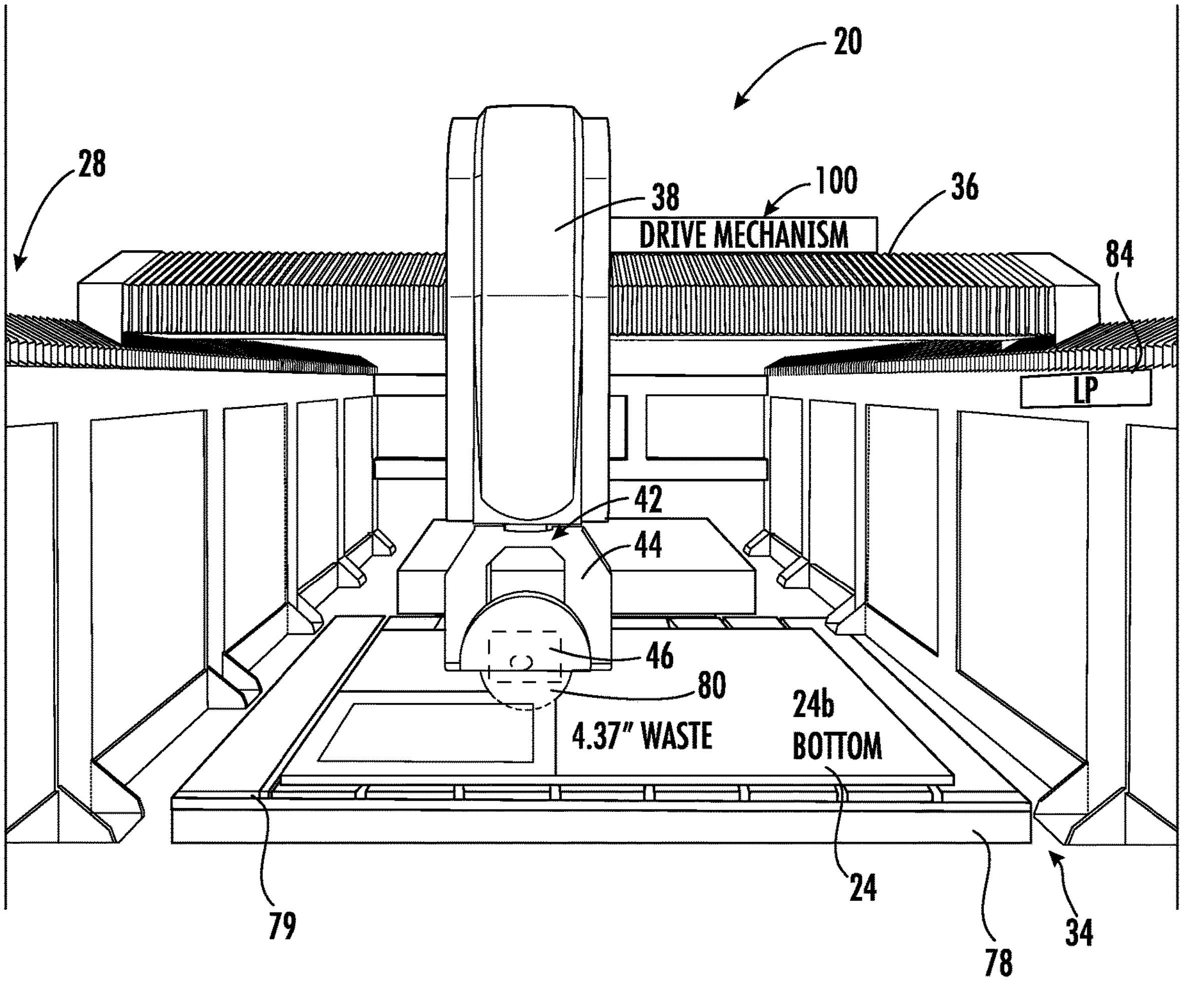
FIG. 3 is a schematic, isometric view of a machine similar to that of FIG. 1 showing a slab being cut on top of a substrate that produces much greater waste.
Figure 4:
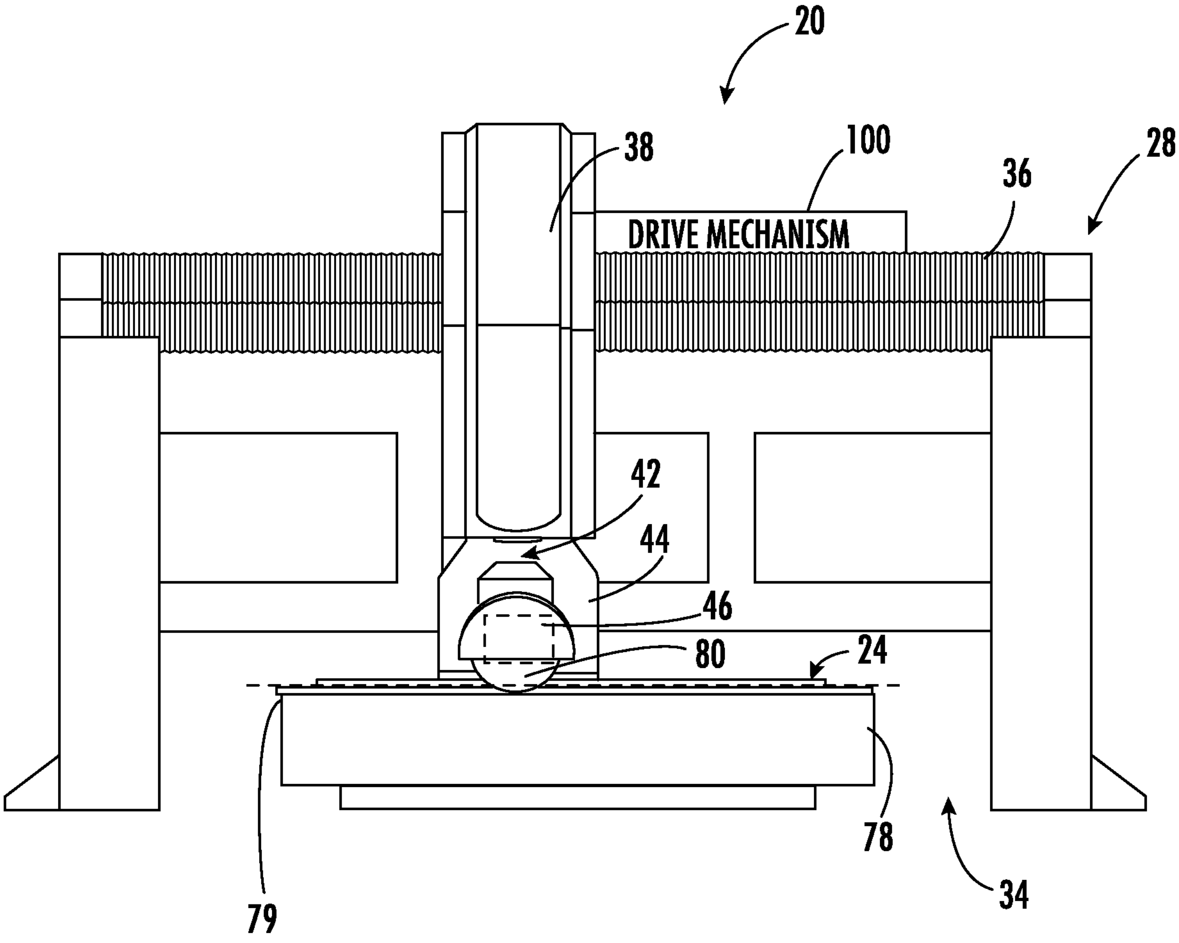
FIG. 4 is a side elevation view of the machine of FIG. 3.

A comparison may be made between the slab cutting shown in FIG. 1 and the slab cutting shown in FIG. 3, where there is much less waste when the slab 24 is on the vacuum pods 26 (FIGS. 1 and 2) instead of on the substrate 79 as shown in FIGS. 3 and 4, There is 1.37 inches of waste in the slab 24 of FIGS. 1, and 4.37 inches of waste in the slab of FIG. 3. It is also possible to separate material with a shorter distance between slab pieces by cutting and then pausing and moving the slab pieces to a new projected position via the laser projector 84 to perform a "cut and move" function without requiring a vacuum lifter in order to raise the slab pieces up and move them greater distances.

Because the machine 20 is performing upside down slab cutting, it is possible to go straight into Phases 2 and 3 for the preparation and finishing of the slab 24 right after slab cutting and perform these slab processing phases on the same work table 78 while the slab is still upside down with little or no movement of any slab pieces. This process may also be referred to as the "hybrid cycle." It should be understood that it is possible to cut polished face up on the vacuum pods 26, however, upside down cutting is preferred. However, it is advantageous to cut polished face down as described. Sink holes 64 (FIG. 7) may be cut with a finger bit 52 (FIGS. 8-11). The cutting may be performed on the rough cut side edges (FIGS. 5 and 14) or on other portions of the slab 24 as shown in FIG. 1, which permits tighter nesting.

After the slab 24 has been cut upside down, is possible to move straight to fabrication as Phases 2 and 3 of the slab processing with the same machine 20 and a single operator. This machine 20 carries out all three phases readily with one operator.

Figure 7:
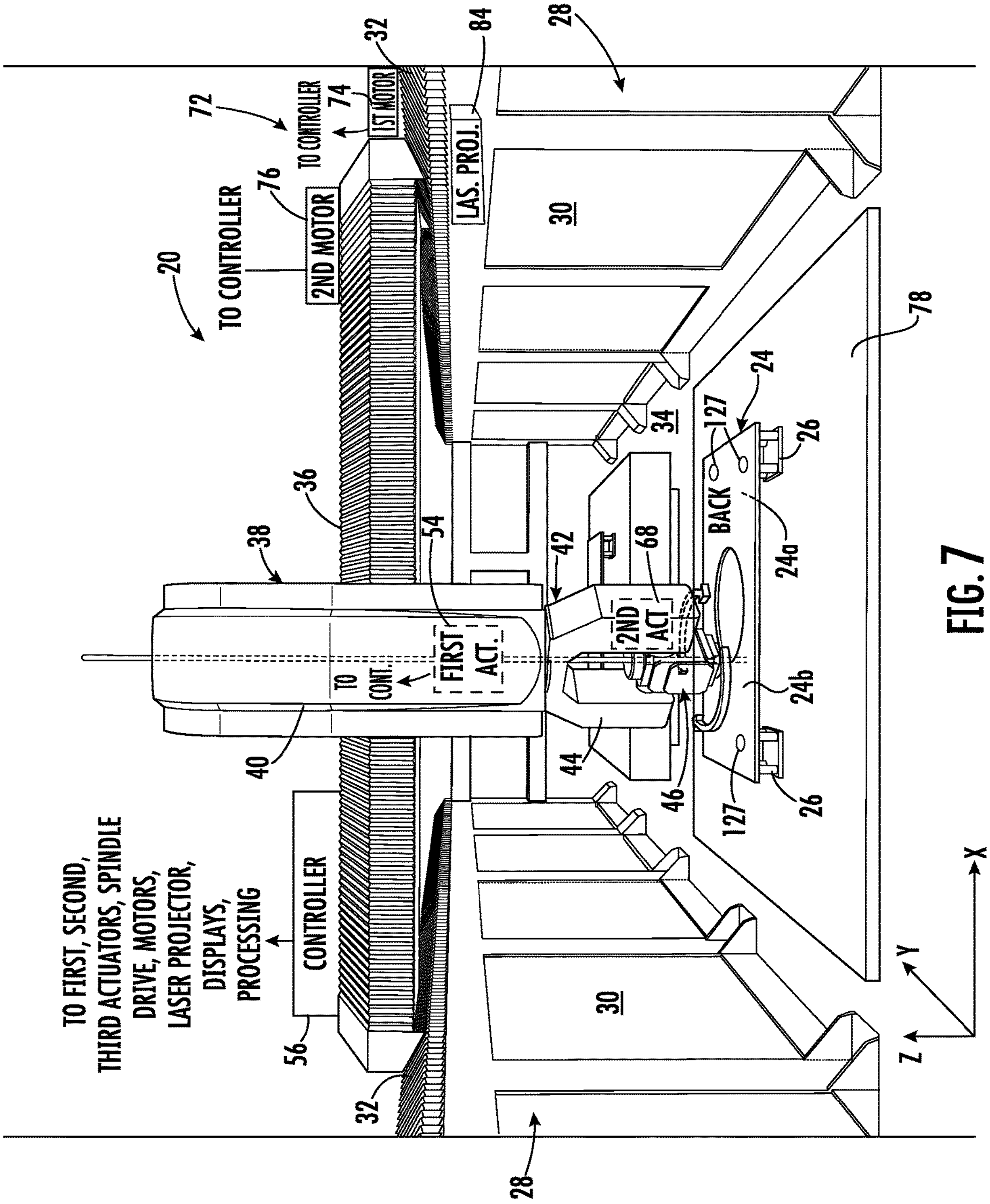
FIG. 7 is a schematic, isometric view of the machine of FIG. 1 that has switched to a finger bit instead of a circular blade and having reduced stresses during routing and cutting such as a sink hole.

The industry prior art standard has been to divide the slab processing of Phases 1, 2 and 3 into a process requiring two separate laborers and requiring at least two separate machines. The machine 20 and method of the current invention overcomes that disadvantage. It is also possible to maximize the machine time using dual work tables with a laser projector system that allows one table to be set up while processing occurs on the other table. This allows the operator to eliminate any down time of a single table fabrication. A single work table CNC router process as shown in FIG. 7 may perform Phases 2 and 3, such as sink hole cutting and finishing and edging. This saves about 2 to about 3 hours of daily down time.

The slab 24 with its finished face 24*a* down is positioned on the vacuum pods 26, which in turn, are on the work table 78 as shown in FIGS. 1, 2, 5 and 7. The slab 24 is correctly positioned and oriented using a mirror image slab cut layout that is based upon a slab cut layout on the finished face of the slab as will be explained with reference to FIGS. 13-21. The machine 20 employs the circular saw blade 80 mounted on a spindle 50 to cut the rough cut side edges of the slab, or other sections of the slab, upside down while positioned on the vacuum pods 26 and following the mirror image slab cut layout to produce a substantially finished slab.

As shown in FIGS. 1, 2 and 5 and described in greater detail with reference to FIG. 7, the machine 20 includes a frame 28 defining a slab processing area 34 in which the slab 24 to be processed extends along an X and Y coordinate axis. The work table 78 is positioned at the slab processing area and includes vacuum pods 26 on which the slab is positioned with the finished face down 24*a* for cutting. In an example, because the slab 24 is upside down, the slab is initially oriented on the vacuum pods using a mirror imaged slab cut layout that is based upon a slab cut layout initially produced on the finished face of the slab as described later with reference to FIGS. 13-21. The bridge 36 is mounted for movement on the frame 28 across the slab processing area 34. The carriage 38 is formed as a vertical column and supports a machining head 46, e.g., cut head. The carriage 38 is mounted on the bridge 36 and configured for vertical movement along a Z-coordinate axis and horizontal movement on the bridge to define movement of a lower end of the carriage that supports the machining head 46 along the X, Y and Z coordinate axes.

Figure 12:
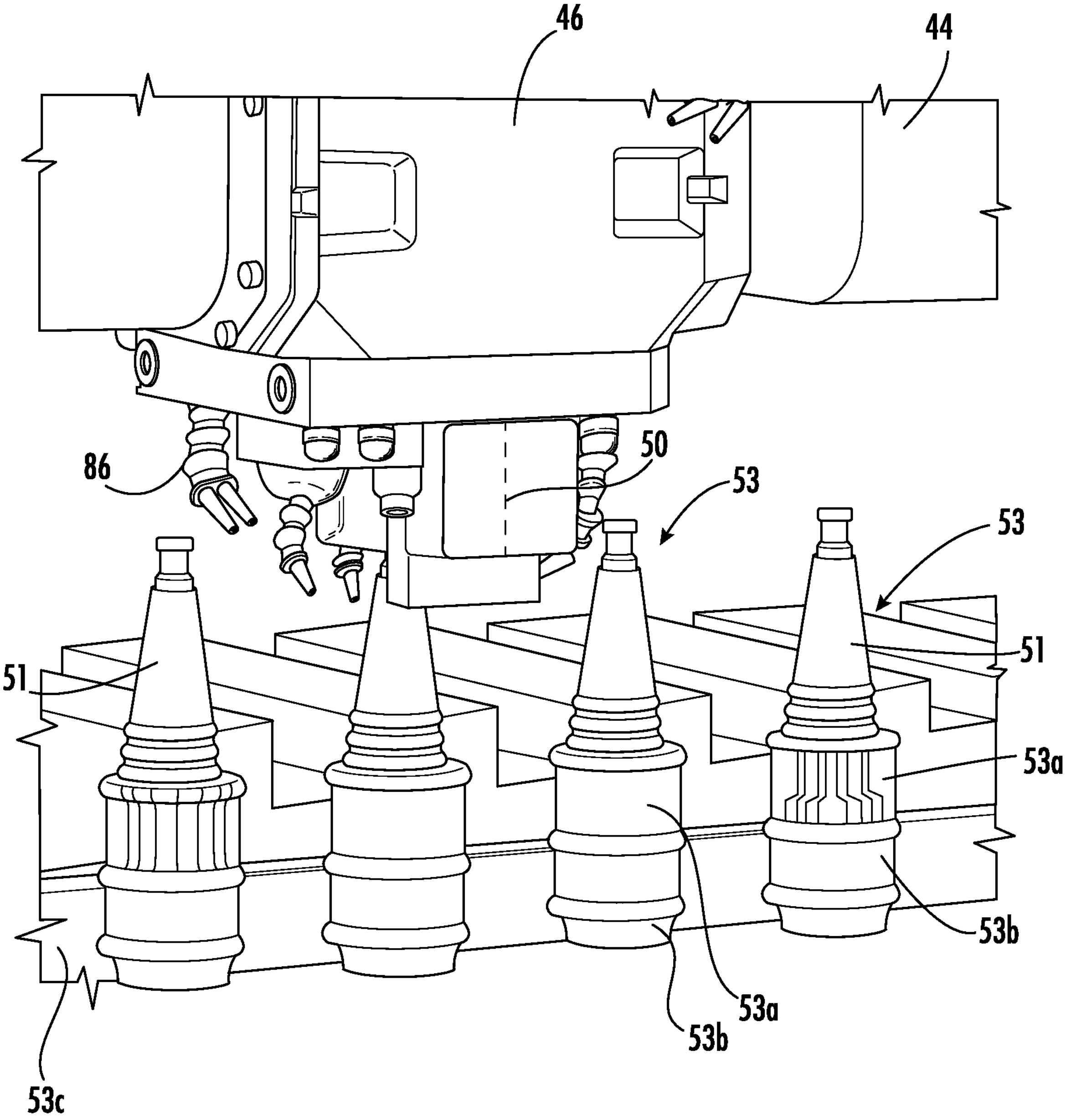
FIG. 12 is a schematic isometric view of the lower end of the machine head in the process of switching out the finger bit with at least one finishing tool for finishing the slab.
Figure 20:
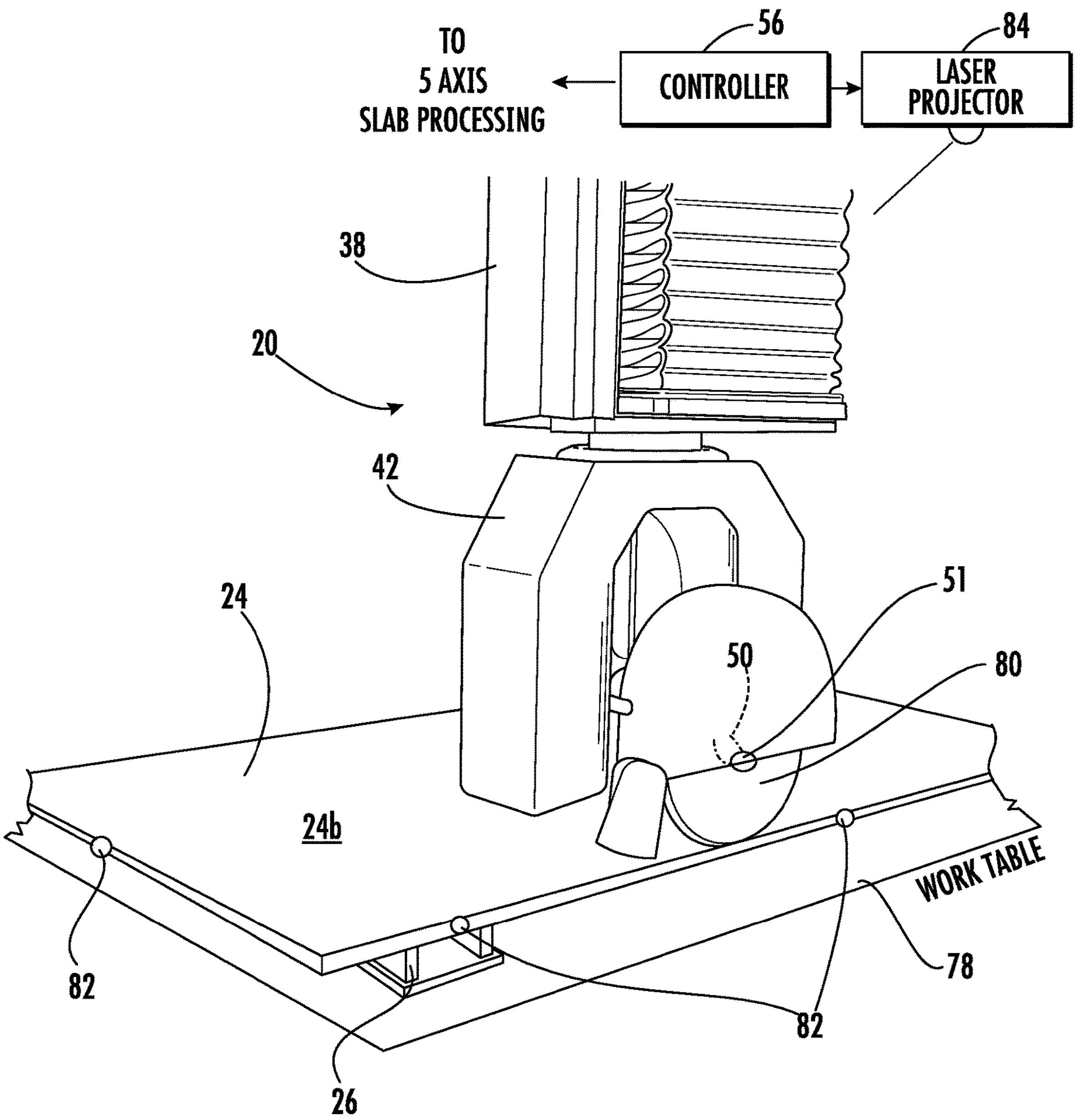
FIG. 20 is an image of the machine having a stone slab correctly positioned upside down for cutting.

A machine yoke 42 is rotatably mounted at the lower end of the carriage 38 and configured for C-axis rotation. The machine yoke 42 includes opposing support arms 44. The machining head 46 is rotatably mounted between the support arms 44 and configured for A-axis rotation. The machining head 46 includes a spindle 50 configured to receive a mounting cone 51 or similar tool receiver onto which the circular saw blade 80 is secured for respective cutting on the slab 24 when the slab is positioned upside down on the vacuum pods 26 (FIGS. 12 and 20). Different mounting cones 51 may support different circular saw blades, finger bits, edging tools, and other finishing tools so that the different mounting cones with different tools may be interchanged into and out from the spindle 50.

Figure 9:
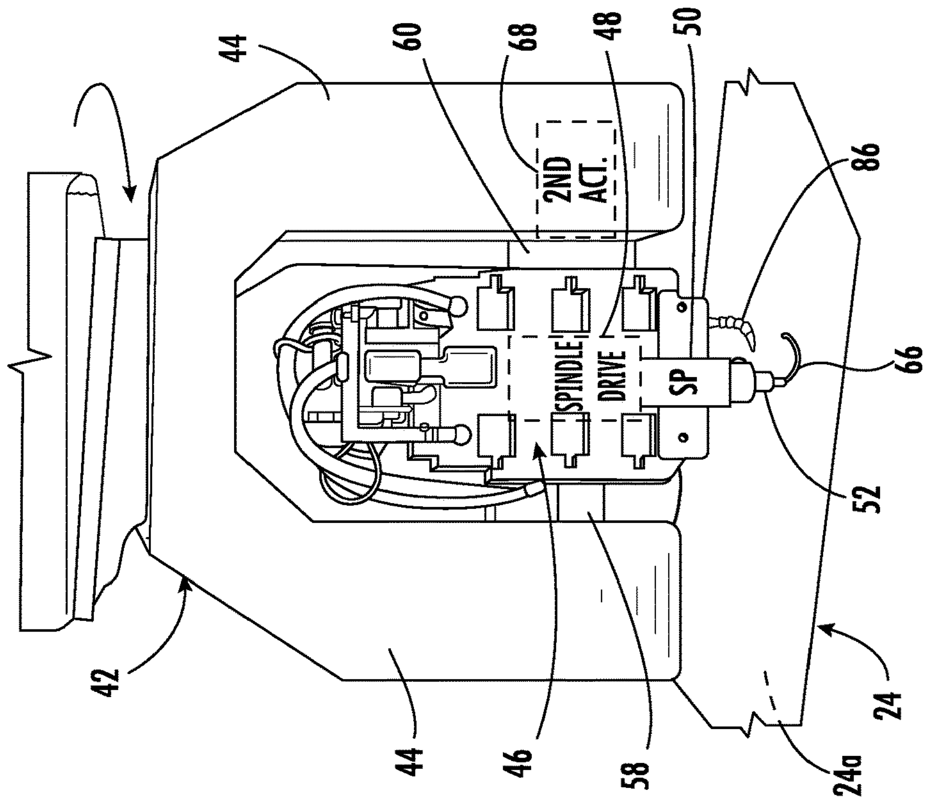
FIGS. 8-11 are schematic, isometric views of the machining head at different stages of finger bit routing a sink hole on the slab and showing the support arm leading along the path of advancement of the finger bit to relieve stress on the A-axis.

At least one drive mechanism, shown schematically at 100 in FIGS. 1 and 5, is connected to the bridge 36, carriage 38, machine yoke 42, and machining head 46 to operate and drive the 5-axis machine as explained relative to FIG. 7 below. The drive mechanism 100, depending on configuration, may be closed or open loop and may include different actuators, electric motors, stepper or servomotors, or other drive mechanisms for driving separate components such as the bridge 36, carriage 38, machine yoke 42, machining head 46 (FIG. 7), and a spindle drive 48 (FIG. 9). Different position sensors if applicable may be incorporated depending on configuration. A controller 56 is connected to the at least one drive mechanism 100 and configured to control movement of the bridge 36, carriage 38, machine yoke 42, and machining head 46 to cut the side edges of the slab or internal sections of the slab while upside down and positioned on the vacuum pods 26 by following a mirror image slab cut layout to form a substantially finished slab, which in an example, may be the configuration of a countertop.

As shown in FIG. 5, relief supports 104 may be positioned on the work table 78 under the rough cut side edges to support outside edge trim relief strips during some cutting examples and prevent chipping or damage to the exterior side of the substantially finished slab after cutting. In an example, the relief supports 104 may be formed from foam blocks inserted under the side edges of the slab 24 and the foam blocks may be configured to permit the circular saw blade 80 to cut therethrough without impacting saw blade operation. Two foam blocks as relief supports 104 may be positioned under each rough cut side edge.

In another example, the relief supports 104 are formed as vacuum clamps 108 (FIG. 6) that have a mounting plate 110 with a bottom surface 112 that is secured by vacuum via a vacuum fitting 114 onto the work table 78 and an upper clamp 116 to secure an outside edge trim relief strip. The upper clamp 116 may include a lower support block 118 and movable clamp member 120 that may be raised and lowered to the lower support block via a fastener such as an Allen screw.

The hybrid cycle incorporates the Phases 1, 2 and 3 of slab processing and allows routing any sink holes 70 (FIGS. 7 and 13) and any radius curves on the slab 24 after cutting the side edges without removing the cut slabs from the vacuum pods 26 and maintaining the finished face down. The slab does not need to be moved in some examples. A finger bit 52 supported on a mounting cone 51 may be inserted within the spindle 50 after removal of the circular saw blade 80 and the routing path based upon a mirror image slab cut layout (FIG. 9). The finger bit 80 may be switched out automatically after a sink hole 70 is cut and replaced with at least one finishing tool 53 as later explained, relative to the example finishing tools shown in FIG. 12, to finish the finished slab by forming an edge profile on the inside of any sink holes and edging and polishing the sides of the finished slab.

Referring now to FIG. 7, a more detailed explanation of the machine 20 is described. The slab 24 has its finished or polished face **24*a* corresponding to the top polished face down and resting on the vacuum pods 26. The machine 20 includes the frame 28 having the vertical supports 30 formed as two opposing side walls, and guide rails 32 are located on the top portion of the frame defined by the vertical supports or side walls. The frame 28 may define the slab processing area 34 in which a slab 24** to be processed extends along an X and Y coordinate axis.

The bridge 36 extends across the slab processing area 34 and is mounted for movement along the guide rails 32 so that the bridge may traverse across the slab processing area. The carriage 38 is mounted on the bridge 36 and includes a vertically extending housing 40 configured not only for vertical movement along a Z coordinate axis, but also for horizontal movement on the bridge to define movement at a lower end of the carriage along the X, Y and Z coordinate axes. The machine yoke 42 is rotatably mounted at the lower end of the carriage 38 and configured for C-axis rotation as illustrated by the horizontal direction of the rotating arrow in FIG. 7. Rotation may be clockwise or counterclockwise. The machine yoke 42 includes opposing support arms 44 such that the machine yoke is similar to an inverted U. The machining head 46 is rotatably mounted between the support arms 44 and configured for A-axis rotation. The machining head 46 includes a spindle drive 48 and the spindle 50 connected thereto shown diagrammatically in the machining head (FIG. 9), such that the spindle drives rotates the spindle that supports a circular saw blade 80, finger bit 52 or other cutting and finishing tools.

In the example of FIGS. 1, 2, 5 and 13, the machining head 46 is rotatably mounted 90 degrees between the support arms 44 along its A-axis so that the spindle 50 is horizontally oriented to mount the circular saw blade 80 for respective cutting of the slab 24 when positioned upside down on the vacuum pods 26. In this position, the cutting occurs and any edge relief strips, such as shown in FIG. 5 when the peripheral edge of the slab 24 is cut, are supported by the relief supports 104 formed as foam blocks in this example, which allows cutting directly through them easily without impacting cutting as would occur when cutting on a substrate such as shown in FIGS. 3 and 4, where the cutting blade impacts the substrate, creating friction and heat, lowering blade performance and reducing cut quality.

In another example of FIGS. 7-12, the machining head 46 is rotated 90 degrees to orient the spindle 50 vertically along the Z or vertical axis as compared to the more horizontal orientation shown in FIGS. 1, 2, 5 and 13. The spindle 50 is configured to mount a router bit, e.g., the finger bit 52 (FIGS. 7-11), for routing a sink hole 64 or performing similar cutting on the slab 24. The machine 20 operates via the controller 56 so that the spindle 50 (FIG. 12) may switch out the finger bit 52 automatically and another finishing tool 53 inserted such as shown by the different finishing tool selections in FIG. 12 that may be used to form an edge profile on the inside of any sink holes 70 and edge and polish the sides of the slab 24.

As illustrated in FIG. 7, the machining head 46 is vertically oriented and the spindle 50 oriented vertically along the Z-axis so that any router or finger bit 52 is perpendicular to the plane of the slab 24 that extends along the X and Y coordinate axis on the work table 78. As described before, the at least one drive mechanism 100 provides for controlled, 5-axis movement, and as described with reference to the machine 20 shown in FIG. 7, the at least one drive mechanism includes different drive components, including different actuators, electric motors, servomotors, stepper motors, or similar components for 5-axis machine function.

A first actuator 54 is carried by the carriage 38 within its housing 40 and connected to the machine yoke 42 and configured to rotate the machine yoke 42 about the C-axis when processing the slab 24, including routing, cutting or performing any finishing operations on the slab 24. The controller 56 is connected to the spindle drive 48 (FIG. 9) and the first actuator 54 and configured to drive the first actuator and rotate the machine yoke 42 and maintain a support arm 44 leading along the path of advancement of the router or finger bit 52 to relieve stress on the A-axis when routing or cutting on the slab 24. Similar functions may be performed when finishing to relieve stress on the A-axis.

At least one shaft 58 (FIG. 9) is supported by at least one of the support arms 44 and axial with the A-axis. The shaft 58 may operate as a support to the machining head 46 and aid in allowing A-axis rotation either by rotating itself or allowing the machining head to rotate thereon. In an example, a gear unit 60 is positioned on one side and the shaft 58 on the other side of the machining head 46 and rotatably mounted between the support arms 44, and configured for A-axis rotation about the shaft and gear unit. The machining head 46 may be used for routing and cutting at different angles. Thus, by rotating the machine yoke 42 during the routing and cutting, and maintaining a support arm 44 leading along the path of advancement of the finger bit 52, stresses are relieved on the A-axis during the routing or cutting of the slab 24, such as when forming a sink hole 70 or other cuts, and also when finishing. The controller 56 may be pre-programmed for the exact cutting or routing path and finishing path on the slab 24 based upon the desired configuration of a sink hole 70 and/or countertop and its desired edge profile, such as on the inside of any sink holes and the edging and polishing on the sides and edges of the slab.

Referring now to FIGS. 8-11, there are illustrated schematic, isometric views of the machine yoke 42 with its support arms 44 and machining head 46 at different stages of finger bit 52 routing a sink hole 70 on the slab 24. The same process as will be described for reducing the A-axis stress may also be performed for other finishing processes of the slab 24 when applicable. As illustrated, the support arm 44 is always leading along the path of advancement of the finger bit 52 to relieve stress on the A-axis such as defined by the shaft 58 and gear unit 60 in this example or other components mounting the machining head 46 for rotation about the A-axis.

Figure 8:
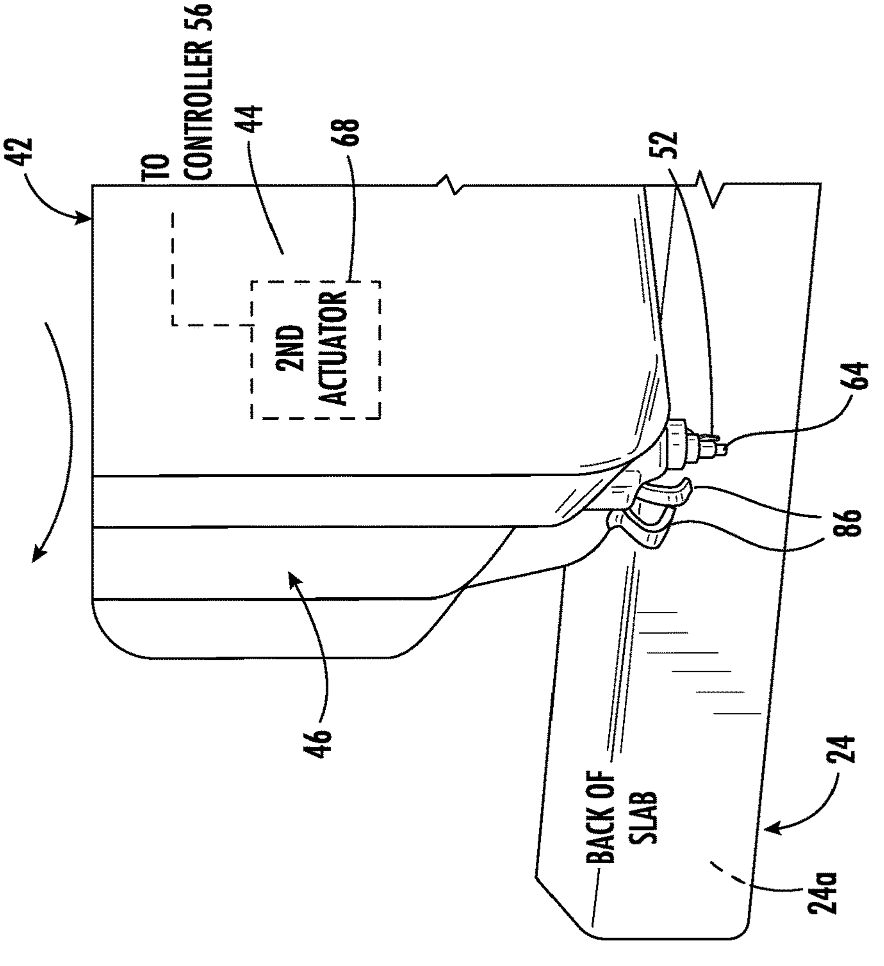

As shown in FIG. 8, the router or finger bit 52 cut is initially made by lowering the carriage 38 that mounts the machine yoke 42 and machining head 46 into the initial routing or cutting position. An initial hole 64 is drilled (or routed) such as corresponding to an interior section of the sink hole 70. The finger bit 52 may be different diameters depending on the sink hole 70 configuration, but the initial cut or hole 64 is made and cutting progresses along the cut line or cut path 66 designed for the sink hole 70. In a non-limiting example, the finger bit 52 may be an engineered finger bit such as a 40 millimeter and operate at about 5,500 to 6,000 rpm in an example with feed rates at more than 15 to 20 inches per minute. The finger bit 52 may be a diamond tool, including in an example a one inch, 35 mm straight finger bit. Another example includes an 8-segment high-speed finger bit 52. Different binders may be used, with a soft binder having a bigger cut potential. Other finger bit 52 configurations may be used.

As the routing or cutting continues as shown in FIG. 9, and shown by the initial rout or cut path 66, the machine yoke 42 is rotated about its C-axis to always maintain a support arm 44 leading along the path of advancement of the finger bit 52 to relieve stress on the A-axis during the routing or cutting operation.

Figure 10:
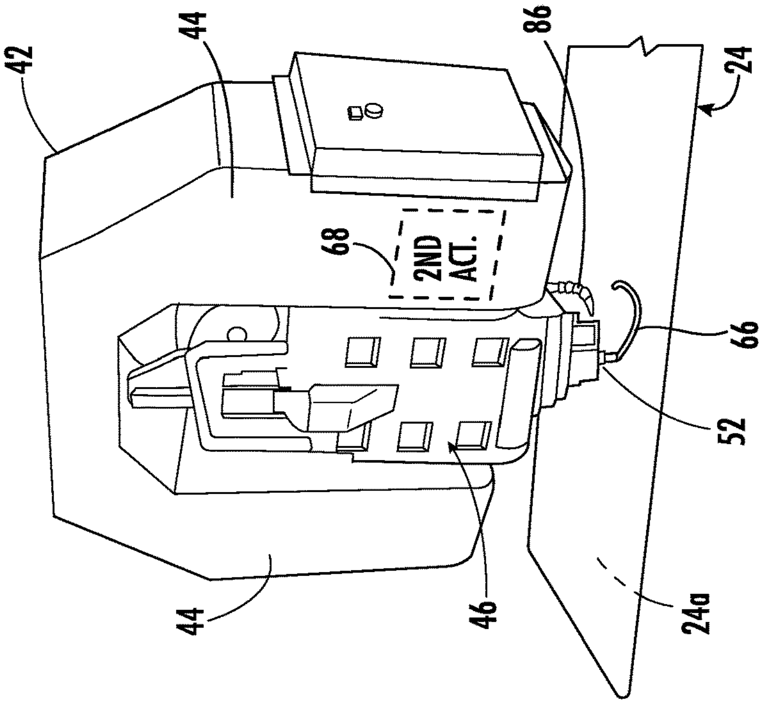
Figure 11:
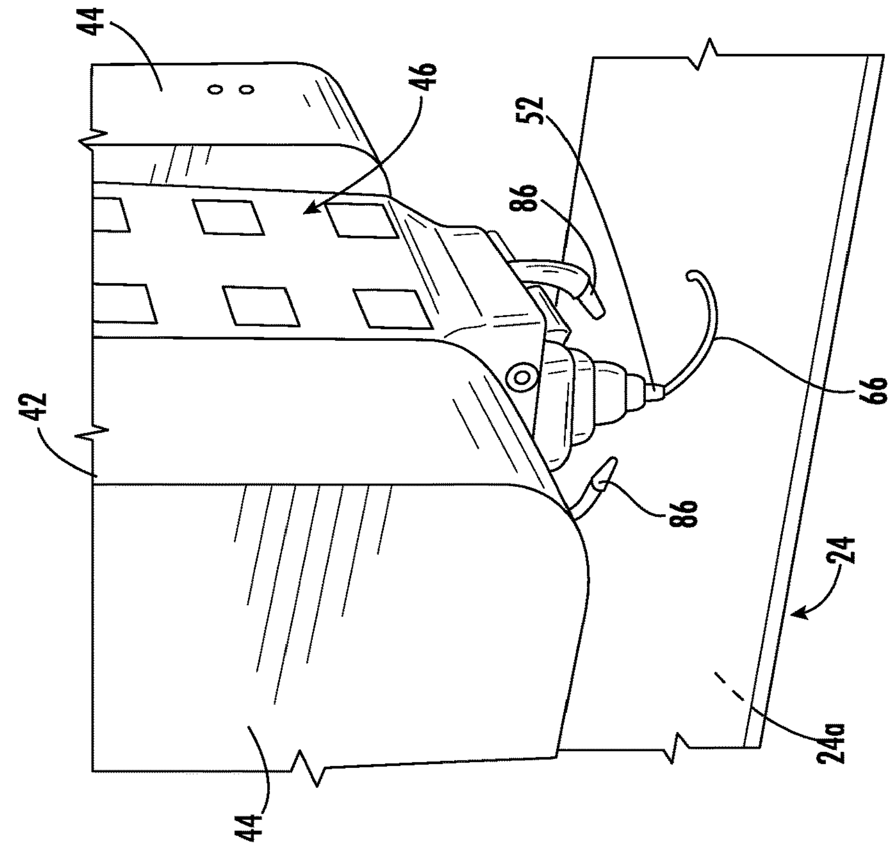

As shown in FIG. 10, the machine yoke 42 continues its rotation to reach a point as shown in FIG. 11 where the cut path 66 is continued in a direction almost 90° from the initial cut path. Depending on the configuration of the sink hole 70 to be formed, the support arm 44 may lead in a straight direction for a predetermined distance and then turn as shown in FIG. 11, where portions of the cut path 66 are straight and then follow with a gentle 90° turn, but with stresses always relieved on the A-axis. A helicoidal movement may be generated during routing/cutting.

During the routing or cutting, the controller 56 may be configured to periodically rotate the machine yoke 180° so that the other opposing support arm 44 is leading along the path of advancement of the finger bit 52 when routing or cutting on the slab 24. This 180 degree rotation to allow the other support arm 44 to lead aids in relieving stress along the same axial direction on the shaft 58, such as any motors, actuators, drive shafts, and gear unit 60 to equal out over time the various stresses imposed on machine components that are in the machining head 46 along the A-axis and along the shaft and gear unit.

A second actuator 68, such as an electric drive motor or servomotor, or other drive unit may be connected to the at least one shaft 58 and/or gear unit 60 and controller 56. The second actuator 68 may be configured to rotate the machining head 46 along the A-axis at different angles for routing and cutting at angles, including 90 degrees as noted before for circular saw blade 80 cutting as shown in FIGS. 1, 2, 5, 13 and 20.

The first and second actuators 54, 68 may be formed as electric drive motors or servomotors and include any other appropriate drive mechanisms. In the example of the first actuator 54, an electric motor may be connected to a gear mechanism (not shown) that rotates the machine yoke 42 about the C-axis and may include a stepper motor or other controlled electric motor or drive mechanism. The second actuator 68 may also be formed as an electric motor, such as a stepper motor or other drive mechanism, that may be mounted in one of the support arms 44 and connected to the shaft 58 or gear unit 60 in a non-limiting example and configured to rotate the shaft and the machining head 46, or mounted within the machining head in an example. Different drive units, stepper motors or other drive mechanisms may be used. The spindle drive 48 also may include an electric drive with an appropriate drive mechanism configured to rotate the spindle 50 at high speeds for circular saw blade cutting, routing, and any finishing operations.

A third actuator mechanism 72 may be supported by the frame 28 and connected to the bridge 36 and carriage 38 and the controller 56 and configured to drive the bridge and carriage during circular saw blade 80 cutting (FIGS. 1, 2 and 5), routing or cutting on the slab 24 (FIGS. 7-11), and finishing with a finishing tool 130 as shown in FIG. 12.

Referring again to FIG. 7, the third actuator mechanism 72 may include a first motor 74 supported by the frame 28 and connected to the controller 56 and bridge 36 and configured to drive bridge movement on the frame. A second motor 76 may be supported by the bridge 36 and connected to the controller 56 and carriage 38 and configured to drive carriage movement on the bridge. Various drive mechanisms may include different actuators, including different electric motors, servomotors, stepper motors, or other appropriate drive mechanisms to maintain exact positioning and control of the bridge 36, carriage 38, machine yoke rotation, machining head 46, and spindle 50 rotation speed. Positioning sensors and feedback sensors if used may be located on different components of the machine 20 to aid in exact positioning of components within thousandths of an inch and mounted on the guide rails 32, frame 28, bridge 36, carriage 38 and other components, including the spindle drive 48 and any actuators and motors 54, 68, 72, 74, 76.

Figure 13:
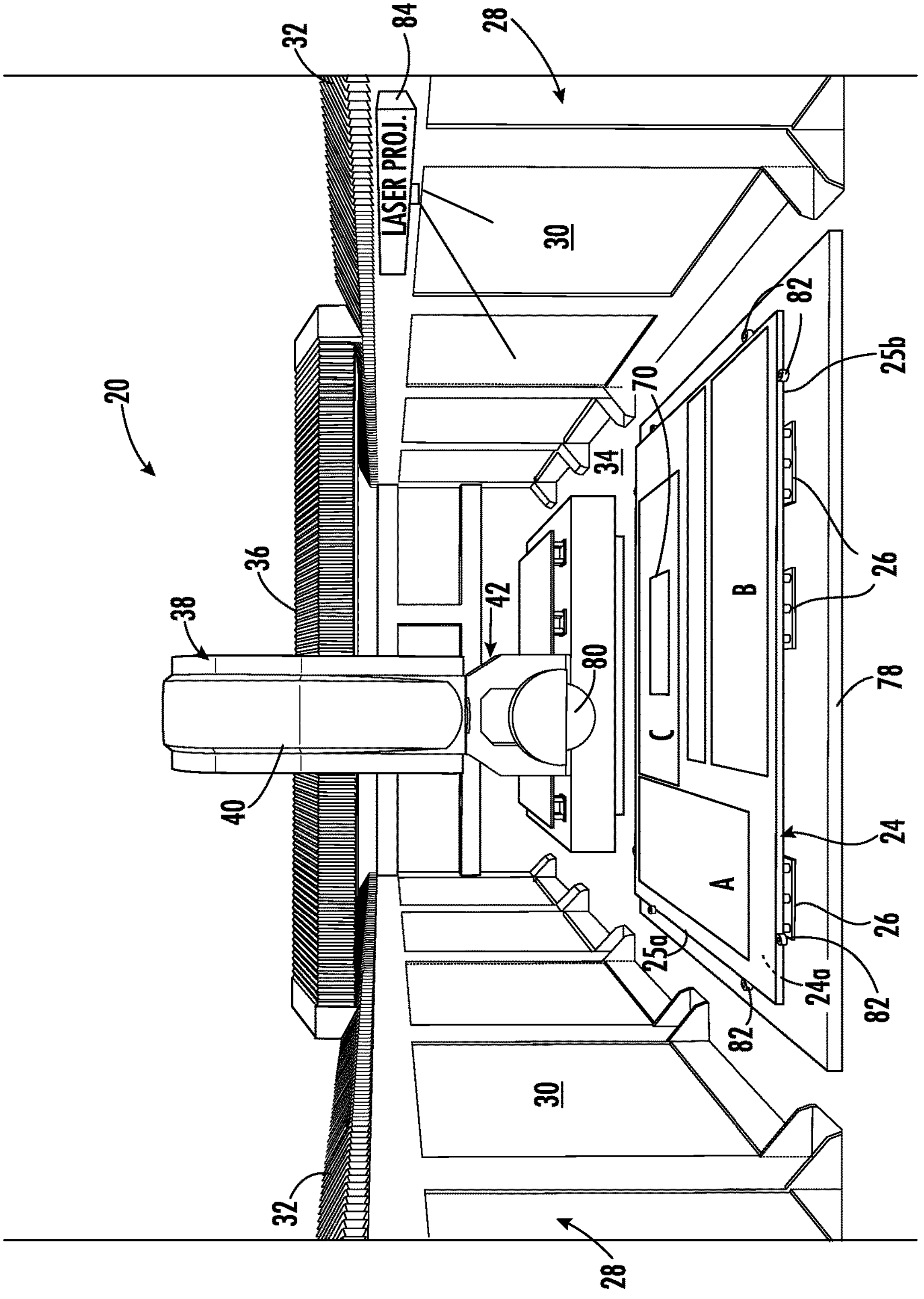
FIG. 13 is yet another schematic, isometric view of the machine similar to FIGS. 1 and 2 showing the machining head having a circular saw blade to cut a slab using a mirror imaged slab cut layout that has been aligned for upside down cutting in a slab cutting position.

The work table 78 is positioned at the slab processing area 34 and the vacuum pods 26 are positioned on the work table. The vacuum pods 26 are configured to support the top polished finished face 24*a* of the slab upside down for initial cutting, routing, and processing on the rear side 24*b* of the slab 24. The work table 78 may include a milled and polished work surface, and in an example, two work tables may be positioned within the slab processing area 34. In the example as shown in FIG. 13, the machining head 46 mounts the circular saw blade 80 via its mounting cone 51 and is configured to be rotated up to 90° along the A-axis into a horizontal orientation as compared to the vertical configuration shown in FIG. 7 (for routing) to permit circular saw blade cutting, such as on the outer peripheral edges of the slab 24, which often are rough cut side edges.

It is also possible as shown in FIG. 7 to form sink anchor holes 127 in the slab 24 when positioned on the vacuum pods 26, before or after sink hole 70 routing. The sink anchor holes 127 may be configured to receive anchors for final mounting of the slab in a residence or business. In the example shown in FIG. 12, the controller 56 switches out automatically the finger bit 52 with at least one finishing tool 53 for forming the edge profile and edging and polishing the sides of the substantially finished slab. In the example shown in FIG. 12, the spindle 50 may receive a finishing tool 53 that supports two vertically spaced finishing tools 53*a*, 53*b* for a dual tool configuration on a single mounting cone 51 to reduce the amount of finishing time and reduce spindle and finishing tool changes.

Figure 6:
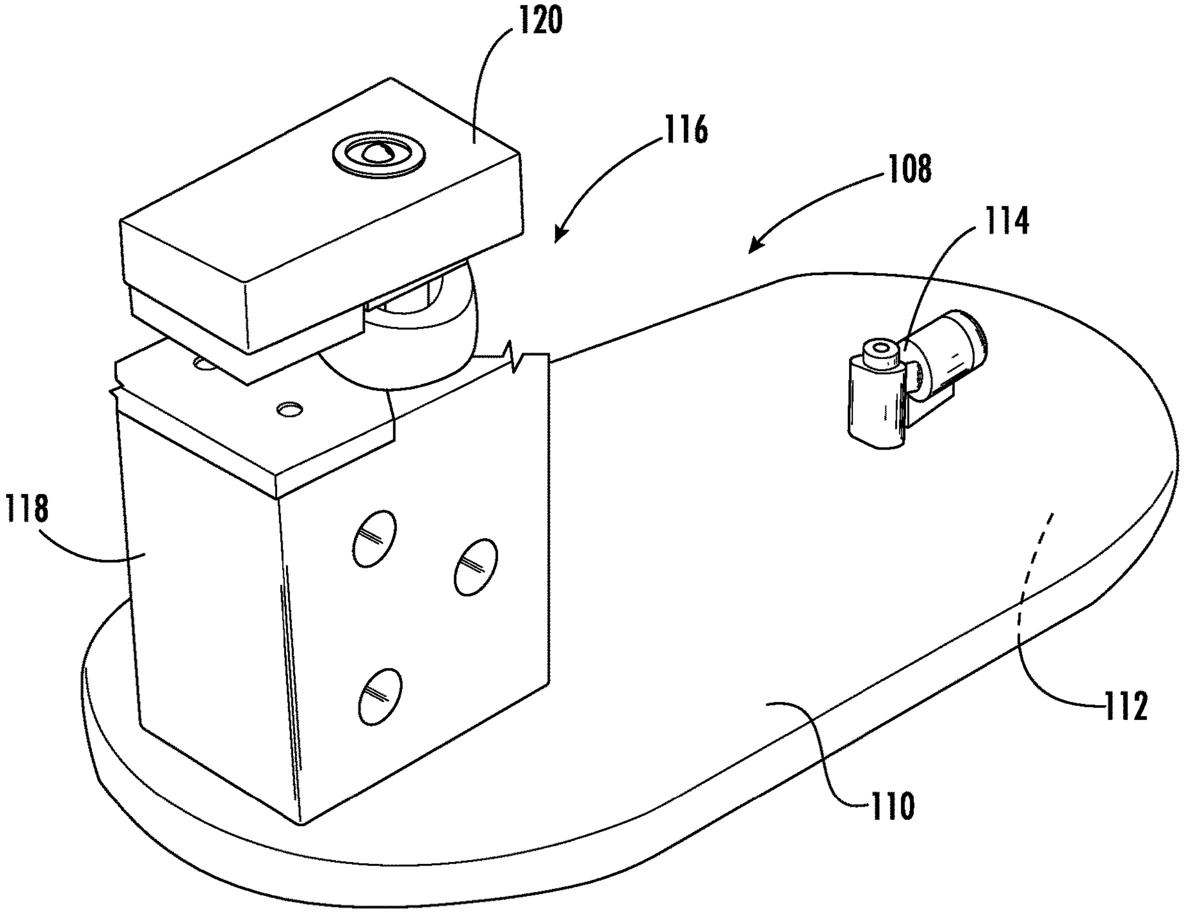
FIG. 6 is an isometric view of a relief support formed as a vacuum clamp.

Any outside edge trim relief strips formed during cutting may be supported by the relief supports 104, e.g., foam blocks, during cutting adjacent to the final cut slab and prevent chipping or damage to the exterior side of the substantially finished slab. The foam blocks or vacuum clamps 108 in this example address the issues where the slabs 24 of stone or engineered stone do not come in shapes of perfect rectangles having 90 degree corners on all four corners. When a slab 24 is cut by a manual bridge saw by hand or by a CNC saw or CNC saw jet, the largest perfect rectangle is cut inside of the slab. The four sides of the slab 24, often referred to as north, south, east, and west, are cut at the slab edges. There are small strips left over from this "trim" procedure also referred to in the industry as "relief" cuts. The relief supports 104 such as foam blocks that are positioned on the work table 78 under the rough cut side edges will support the outside edge trim relief strips during cutting and prevent the chipping or damage to the exterior side of the substantially finished slab 24. The strips do not fall during the cutting process and are held by the foam blocks as shown in FIG. 5, or by an example vacuum clamp 108 as shown in FIG. 6. Foam blocks are preferred in an example since the circular saw blade 80 that is cutting in the air because the slab 24 is raised on the vacuum pods may easily cut through the foam blocks while the edge strips are supported by the foam blocks. Any chipping or damage to the exterior side of the substantially finished slab is prevented.

Different finishing and edging tools 53 such as the example tools shown in FIG. 12 may be used and interchanged into the spindle 50. The finishing and edging tools are formed as dual finishing tools, i.e., two stacked tools per mounting cone 51. When one mounting cone 51 is received in the spindle 50, two vertically spaced finishing and edging tools 53 are in stacked relation to each other, and during finishing, time is saved on the interchange of the finishing and edging tools and mounting cones 51.

The machine 20 as illustrated in FIG. 13 shows an example slab 24 positioned on the vacuum pods 26 and a diagram of a mirror imaged slab cut layout, which in an example may be laser projected towards the slab as will be described in greater detail below. Reference is further made now to FIGS. 13-21 with greater details describing the mirror image slab cut layout and the controller processing.

Figure 14:
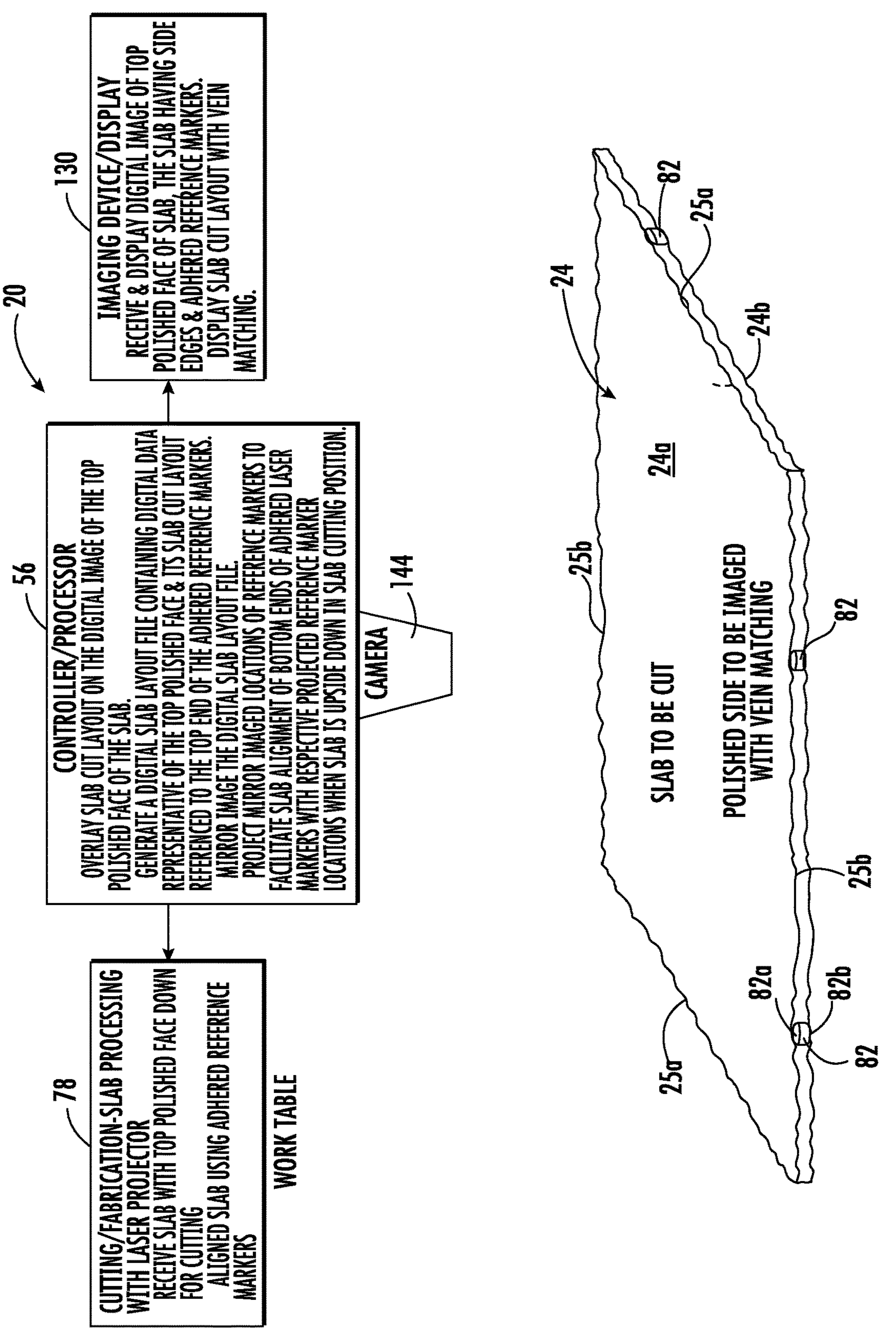
FIG. 14 is a schematic block diagram of the system of processing a stone slab by mirror imaging a digital slab layout file.

As noted above, the slab 24 is positioned upside down for cutting and positioned on the vacuum pods 26. Mirror images are used to position the slab for correct cutting and routing. The slab 24 has a top polished or finished face 24*a* and a bottom surface 24*b* with the bottom surface facing up and finished face down as shown in FIGS. 7, 13 and 14. Reference is made to the process described in U.S. patent application Ser. No. 18/327,101 filed Jun. 1, 2023, the disclosure which is hereby incorporated by reference in its entirety.

As shown in FIG. 14, an imaging device 130, such as a display of a computer or other processing device, including a display connected to the controller 56, may be configured to receive and display a digital image of the top polished face 24*a* of the slab 24. When first processed, the slab 24 has rough uncut side edges, and in an example, is a quarried slab roughly cut into a substantial rectangular pattern, which is to be cut, and has opposing short sides 25*a* and opposing long sides 25*b*. The slab 24 in this example may be about 2.0 to 3.0 centimeters thick, and in another example, about 1.25 to 1.5 inches thick and some slabs about 1.375 (1⅜) inches thick as a commercial grade slab for a countertop. A plurality of reference markers 82 are adhered on at least one side edge of the slab 24 and shown as cylindrically shaped markers in FIGS. 13 and 14.

In the example of FIG. 13, at least one long side 25*b* includes at least two adhered reference markers 82 and at least one short side 25*a* includes at least one adhered reference marker, but may include two adhered reference markers 82 on each side. Each of the adhered reference markers 82 are the thickness of the slab 24 and each have a top end 82*a* and a bottom end 82*b* flush with the respective top polished face 24*a* and bottom surface 24*b*. Each reference marker 82 may be formed as a cylindrically shaped foam element to allow contraction and expansion back to normal size if the markers are pressed when the slab is moved.

Figure 15:
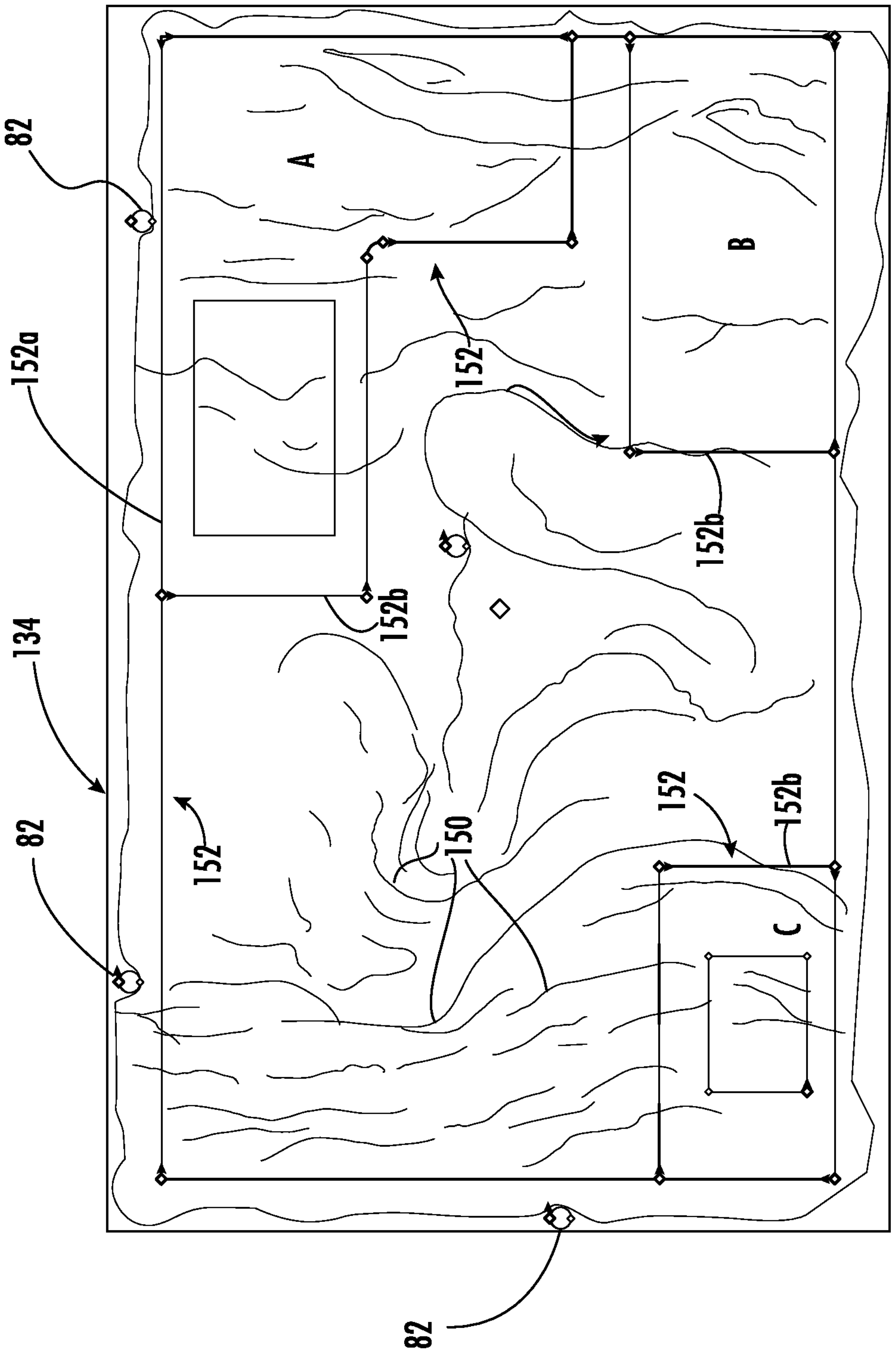
FIG. 15 is a digital image of the stone slab showing the top polished face and a location of adhered reference markers.

A slab digital image 134 (FIG. 15) may be obtained from a camera 144 connected to the controller 56 or other processor, which takes a photographic image of the slab 24 to be laid out and cut. The reference markers 82 may be adhered by a preferred waterproof adhesive to the edge of the slab 24 as illustrated before the camera 144 generates the image in order to obtain a digital image 134 of the top polished face 24*a* of the slab, together with the reference markers 82 (FIG. 15). The digital image 134 will show the locations of the adhered reference markers 82 on the long side 25*b* and short side 25*a* based upon the configuration of the rough generally uncut side edges. It should be understood that the machine 20 with its associated system as described for slab alignment may be used even when the slab 24 and side edges 25*a*, 25*b* are accurately cut straight edges to permit other cutting, routing, or finishing operations on the slab.

The slab 24 may include a surface appearance as a grain pattern produced by veins 150 (FIG. 15) that are matched when the slab cut layout 152 is generated, such as by a CAD program, e.g., Slabsmith, which is based on how the slab will be cut, e.g., a countertop, table, floor, or other slab component. The outer rectangular line 152*a* represents the outer cut line for producing the large rectangular slab, and the other lines 152*b* are for a sink cutout, kitchen tabletop, and other slab components that are matched together and indicated by the designators A, B and C.

The slab 24 may be formed from different slab materials including granite, marble, quartz, soapstone, and other quarried materials or engineered stone and hybrid or combinations of synthetic and stone material held together by a resin binder, for example.

The controller 56 receives the digital image 134 (FIG. 15) of the slab 24 and its top polished face 24*a* and forwards the digital image data to the imaging device 130 as a display, and via user or operator input on a keyboard, mouse, etc., the controller 56 and associated software program overlays the slab cut layout 152 on the digital image 134 of the top polished or finished face 24*a*. For example, in the diagram of the digital image, there is a large rectangular outline 152*a* corresponding to the rectangular slab to be cut from the rough cut slab 24, and the other lines may correspond to the kitchen components such as a sink hole cutout 70 as shown in FIG. 13. Other components can be laid out and cut from the slab.

Figure 16:
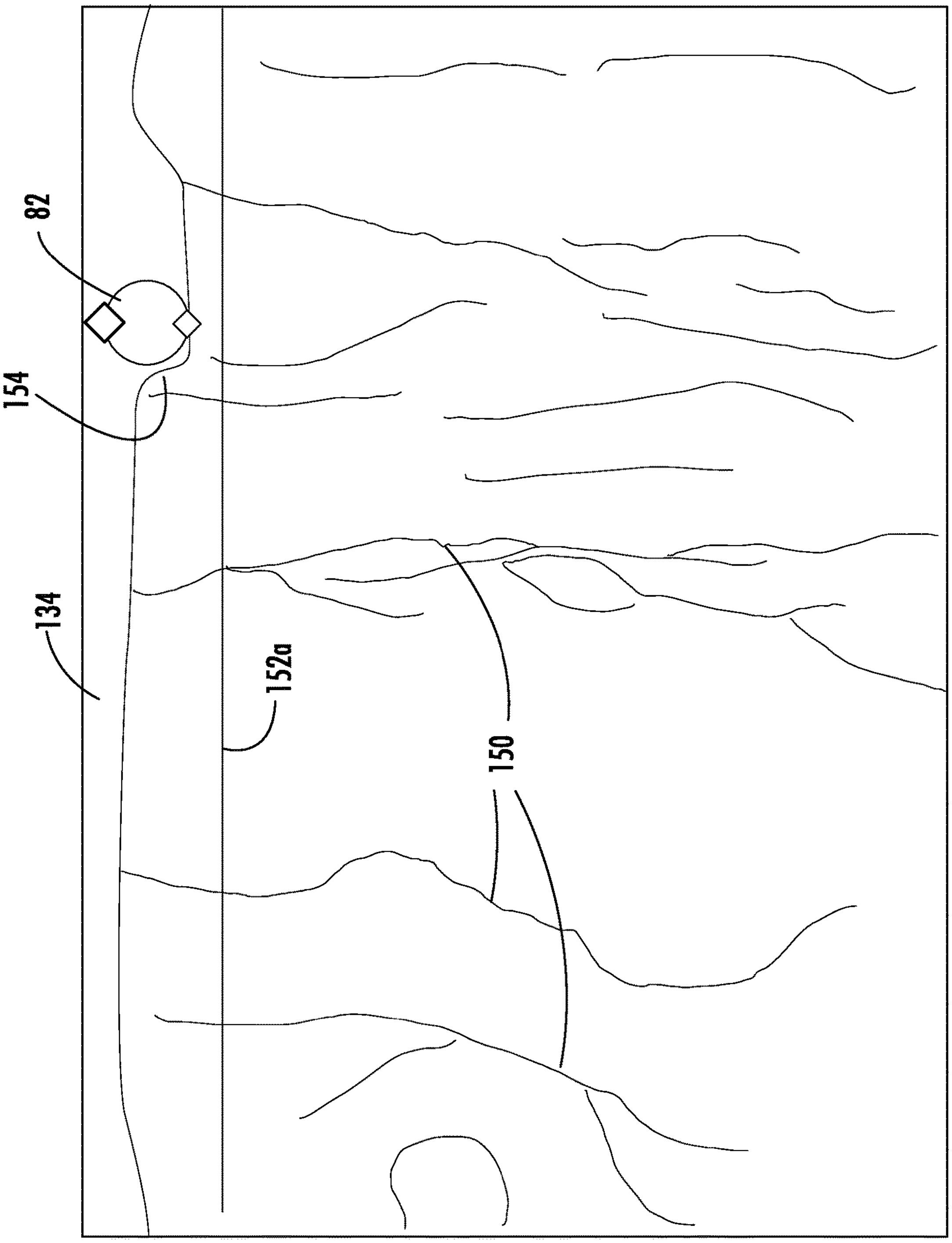
FIG. 16 is an enlarged section of the image of FIG. 15 showing a reference marker location relative to the uncut slab edge.

FIG. 16 is an enlarged image of a portion of the slab digital image 134 of FIG. 15, and showing a rough crevice 154 on the slab edge and adhered reference marker 82 depicted by the software as in a circle at that location. The controller 56 via its CAD or other software or even firmware program may generate a digital slab layout file that contains digital data representative of the top polished face 24*a* and the slab cut layout 152, which are referenced to the top end 82*a* of the adhered reference markers 82. The digital slab image file may be a vector file such as a CAD file, and in an example, a Drawing Exchange Format (DXF) file.

Figure 17:
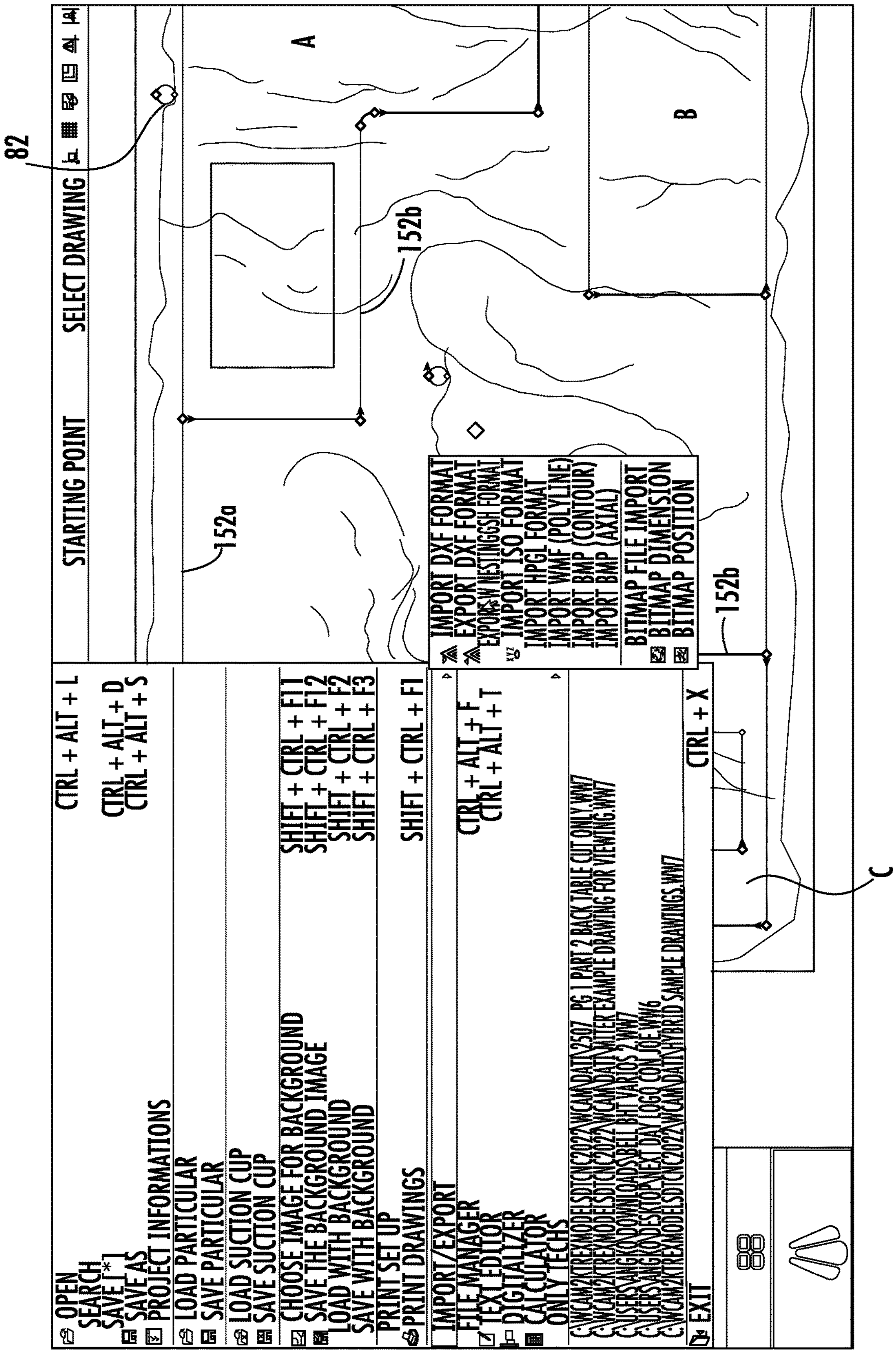
FIG. 17 is an example schematic screenshot showing user manipulation by exporting a digital slab image file.
Figure 18:
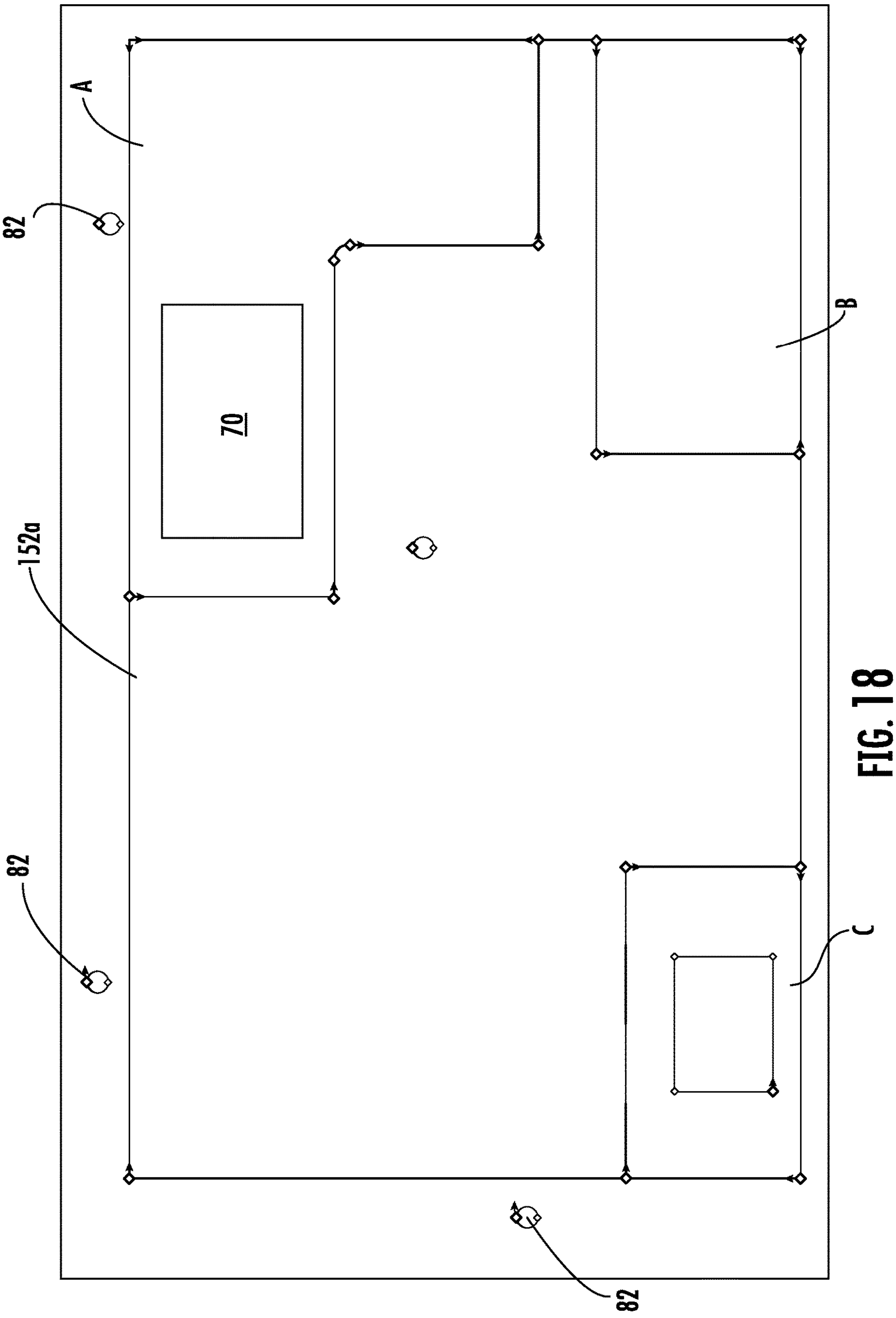
FIG. 18 is a schematic image of the digital slab layout file of FIG. 15.
Figure 19:
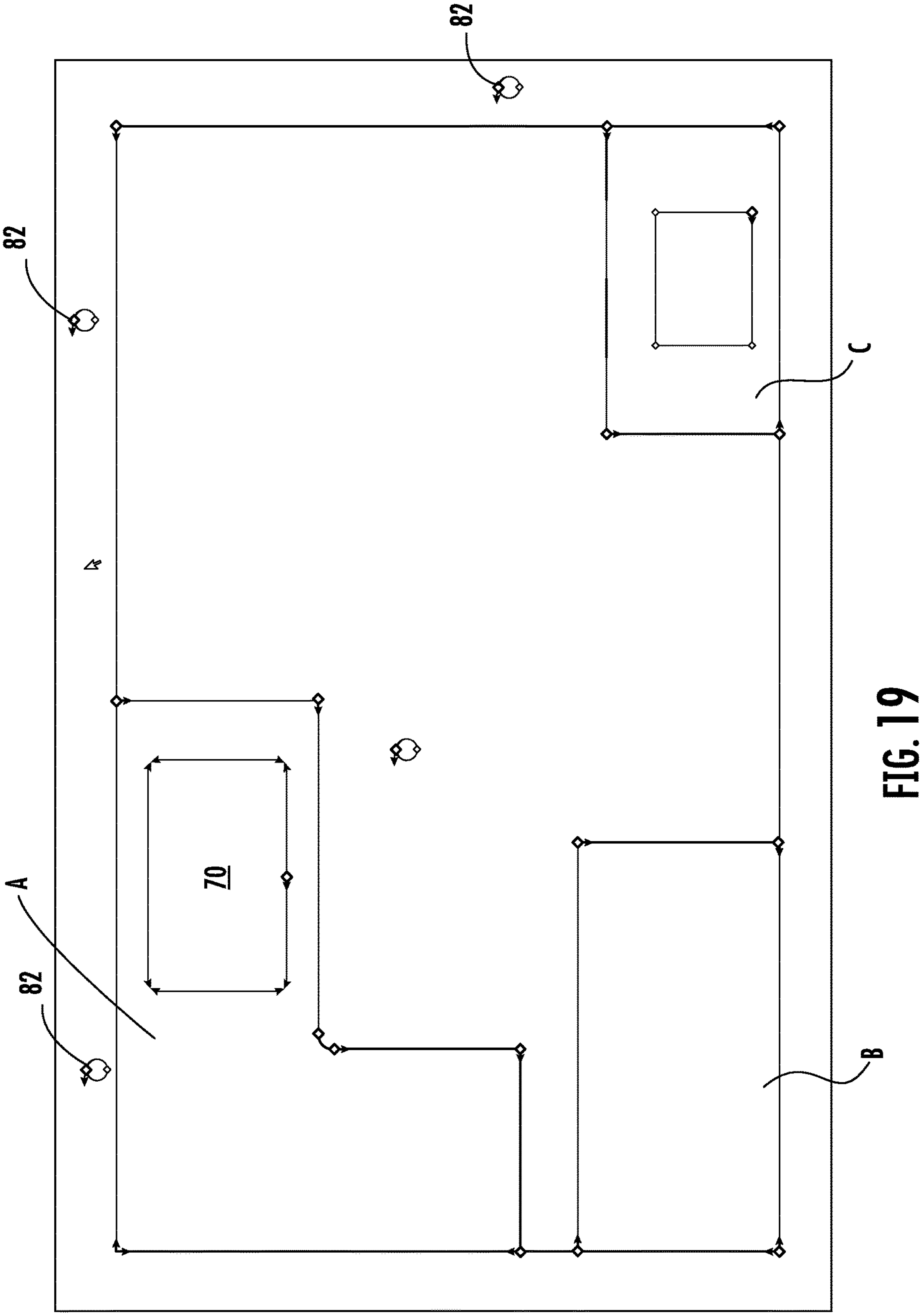
FIG. 19 is a mirror image of the digital slab layout file of FIG. 18.

The reference markers 82 may be traced by the CAD feature of the layout software and show up as a DXF file layout as shown in FIG. 18. As shown in the image of FIG. 17 illustrating user input of the file, the DXF format may be exported and mirror imaged (FIG. 19) so that the reference markers 82 are positioned in mirror imaged locations corresponding to when the top polished face 24*a* of the slab 24 is in a reverse or upside down position for cutting with the top polished face down and cutting occurring on the bottom surface 24*b*. The sink cutout or sink hole 70 and labeled sections A, B and C are reversed and are shown in FIG. 19. In the example of FIG. 13, a different mirror imaged layout is shown with different cut sections A, B, C on different sections of the slab as a non-limiting example. Once a slab is correctly positioned, the CNC programming may be used to cut, route and finish the slab based upon the original cut layout that is mirror imaged.

The controller 56 is connected to the laser projector 84 (FIGS. 7 and 13) showing the CNC slab processing machine 20 as a cutting/fabrication machine. The mirror imaged locations of the reference markers 82 are projected as digital data by the controller 56 to the laser projector 84, which projects as green light, in an example, the mirror imaged cut layout and importantly the location for the adhered reference markers 82. The bottom ends 82*b* of the adhered reference markers aligned with respective projected reference marker locations when the slab 24 is upside down for cutting in a slab cutting position on the vacuum pods 26 positioned on the work table 78 (FIG. 20).

It should be understood that the reference markers 82 formed from the cylindrically shaped foam elements in this example may be any diameter, but typically are the same length as the thickness of the stone slab 24 so either end of the foam piece is flush with the respective surfaces 24*a*, 24*b* of the stones slab. At the very least, there should be two reference markers 82 on one of the long sides 25*b*, such as the top long side, and one reference marker on either of the short sides 25*a*. The reference markers 82 as foam elements may be adhered to the side edges by a waterproof adhesive or similar adhesion technique, and are adhered before a photo image of the slab is taken to generate any slab cut layout. The reference markers 82 will appear in any images as circles and may be traced by a CAD feature of any layout software.

In this example, the reference markers 82 may show up on a DXF file layout (FIGS. 18 and 19) produced from the Slabsmith-type software and CAD features. When these files are used for execution on the machine 20 as a cutting/fabrication machine, the location of the reference markers 82 are mirror imaged and their locations are highlighted and projected via the laser projector 84. Because the slab 24 is upside down with the top polished face 24*a* down and bottom surface 24*b* up for cutting, the only visible references for positioning the slab correctly based upon a desired cutting layout and subsequent sink hole routing and later finishing will be the laser indicating the proper location where the bottom surface of the cylindrical foam reference marker 82 on the actual physical slab are to be located, and thus, enable exact positioning of the slab for cutting upside down in the proper slab cutting position.

As noted before, the machine 20 includes its work surface as the work table 78 on which the slab 24 is positioned upside down on the vacuum pods 26 with respect to the mirror imaged digital slab layout file. In this example, the work surface as a work table 78 supports the vacuum pods 26 on which the top polished face 24*a* of the slab 24 is positioned for upside down cutting. The upside down cutting of the slab 24 occurs on the vacuum pods 26 and exact positioning is required.

The work surface as a work table 78 may be formed as a polished or engineered stone slab such as a quartz slab that has been milled to a flat polished surface and a precise dimension on its surface for CNC cutting and fabrication of a stone slab 24. In an example, the work table 78 may be formed from a quartz slab having a top surface that is substantially level along the Z axis. The vacuum pods 26 are positioned on the work table 78 and the vacuum pods provide a safe and secure holding system for the stone slab, and thus, do not require a fabricator to drill into the slab 24 or work around the edges of a countertop.

In this example, the vacuum pods 26 are rectangular configured and include vacuum ports and vulcanized rubber fused onto an anodized aluminum surface with a tolerance of +/−0.02 millimeters In an example, the vacuum pods 26 project 150 millimeters above the work table 78, which may be a reference for vertical positioning and height, also corresponding to about 5.90551 inches. The slab 24, which may be about 1⅜ inches, is raised from the work table 78 on the vacuum pods 26 in order to cut, rout, drill, machine and polish edges. The friction pads on the vacuum pods 26 as noted before may be made from hot vulcanized rubber fused onto an anodized aluminum surface to endure the harsh and demanding industrial requirements of stone slab cutting. The heights of the vacuum pods 26 may vary, but generally will raise the slab 24 150 millimeters, and in an example, at least a few inches off the work table 78. This permits better cutting either straight or as a bevel and the "deep plunge" with minimal waste (FIGS. 1 and 2) as compared to the cutting directly on a substrate (FIGS. 3 and 4).

For cutting stone as in the example of FIGS. 1, 2, 5 and 13, the cutting blade as a circular saw blade 80 may be formed from ceramic or similar materials. The mounting cone 51 may be configured to mount or couple the cutting blade 80 to the spindle 50, which receives the mounting cone in a locking relationship (FIG. 20). Tools for cutting, routing, polishing, etc. may be interchanged as the different tools may be mounted on different coupling or mounting cones 51, with examples of the finishing and edging tools 53 shown in FIG. 12.

The machine 20 may be formed as a slab cutting and fabrication machine, such as a five axis CNC machine sold by Poseidon Industries, Inc. as the T-REX. This CNC fabrication center may operate as a 5 or 4 axis CNC bridge saw. Slab pieces may be moved around with vacuum lifters. It may also operate as a 5-axis CNC profiling machine and sculpting machine. It has an automatic tool changer operative with the machining head 46 and spindle 50 to interchange different tools, e.g., profile or finishing and edging tools 53 as shown in FIG. 12, a circular saw attachment, or a routing tool, such as a finger bit router. It may include a 25 horsepower to 35 horsepower spindle depending on configuration and operate with an 18 inch to 20 inch circular saw blade (FIGS. 1, 2, 5 and 13) with a blade attachment for a 20 inch blade diameter. It may include a 20 tool magazine with two tools on one mounting cone 51 for dual tool finishing without requiring the spindle 50 to interchange tools every time a different tool is required.

The machine 20 is available in single and dual table models. In FIGS. 1, 3, 5, 7 and 13, dual work tables 78 are illustrated. In the configuration with a 35 horsepower motor and 20 inch blade, the X-axis may be about 160 inches and the Y-axis may be about 100 inches. The air may have continuous 125 pounds per square inch at about 10 cubic feet per minute flow rate. Water line capacity for clean water is 1 to 2 gallons per minute to aid in cooling and debris removal during cutting via water spray nozzles 86 as shown in FIGS. 8-12. A capacity water line ready with recycled water may be 4 to 6 gallons per minute. The machine weight is about 17,000 pounds and uses 400 volts with mutual 80 amp three-phase power.

All cuts, routing and subsequent sink hole and edge finishing and polishing in the finishing process as described above may occur while the slab 24 is positioned on the vacuum pods 26 in an upside down position. The laser projector 84 (FIG. 13) not only projects the locations for alignment of the reference markers 82 and the slab 24 towards the work table 78 in an upside down position for correct positioning of the slab and subsequent cutting, routing and polishing, but may be used in an example to help guide the machining head 46, also referred to as a cut head. The CNC controller 56 typically will use the mirror imaged slab cut layout based upon exact positioning of the slab 24 to control and guide the machining head 46. The laser projector 84 may be mounted above the work table 78 and may employ a green or red light laser that is controlled via the controller 56.

The laser projector 84 may include thermal management for temperature stability and include fiber-coupled lasers with red and/or green laser source having an output power that varies and may range up to 14 milliwatts and a conventional output power of about 7 milliwatts. It may have a focus range from about 0.5 meters to 7.0 meters and a working distance using a tele-optic up to about 14 meters. Different cooling options may be available such as an air hose or water cooling system to help keep the tools and slab cooler during processing. The green light laser, which is preferred, has greater variability than the red light laser. The fan angle can range from 80° by 80° and with tele-optic about 60° by 60°. Accuracy may be about 0.25 millimeters per meter with the focus range from about 0.5 meters up to about 7.0 meters as a standard focus, and in an example, about up to 14 meters in some examples. Operating voltages may vary, and in an example, be about 24 volts DC. The laser projector 84 may include different interfaces such as Ethernet TP, 100 based TX or RS-232 or other interfaces.

The laser projector 84 provides for quick and accurate alignment of a slab 24 and the laser projector may show the cut edges of a slab on the basis of complex construction files on the original scale with slabs optimally aligned on the vacuum pods 26 and work table 78 using slab contours. The laser projector 84 may be used with dual work tables 78, such as shown in FIGS. 1, 3, 5, 7 and 13. The contours of a finished workpiece may be projected on the slab 24 via the laser projector 84.

The work table 78 may include a base on which one or more quartz slab pieces are secured. This is applicable to the dual work tables, where their bases may be constructed using cement, such as quickset cement and thinset, and work tables constructed 1 and ¼ inch to about 1 and ½ inch thick on the base. Quartz slabs may be used on top of the base, such as two or three pieces for the work table, each quartz slab being about 3 centimeters thick, and in another example, about 1 and ¼ inch. The levels of the two work tables 78 are equal in level with each other, which is important when uneven floors may create inconsistencies.

For example, a mortar mix may be poured and the quartz slabs floated with thinset mortar in between. A standard work table 78 dimension made of three pieces for a quartz slab table may be about 4,000 millimeters by 2,000 millimeters or about 157.6 by 78.5 inches. The two work tables 78 are milled down to the exact same height within thousands of an inch. There is a tolerance to mill both tables level with each other because there is a 1 and ¼ inch quartz slab. A diamond bit from the machine 20 may mill the work table 78 faster than prior art aluminum and similar prior art tables. Unless there is a jumbo dual table construction, one laser projector 84 may be used for both work tables 78 with the work tables next to each other as illustrated in some of the drawing figures. A tool rack 53*c* (FIG. 12) holding the finishing tools 53 or other tools may be located between the work tables.

At the top and bottom outward corners from the on each work table 78, 1⅛ inch or 1⁵⁄₁₆ inch diameter holes are drilled, and crystals dropped into the holes. When the laser from the laser projector 84 is projecting from the top, the crystals at the outer corners of each work table 78 act as a calibration so that the controller 56 receiving input from the laser at the laser projector 84 calculates where the work tables are located and especially the height of slabs being placed for processing. In order for the laser to tell the operator where the slab 24 is to be positioned, it needs a certain height calibration. The crystals in each hole are used for that calibration and may be dropped into the holes for calibration in the morning and after lunch during a slab processing day.

An operator may press a button on a panel connected to the controller 56 and the laser emits its optical beam at the crystals and scans the work tables 78. When the optical beam from the laser impacts the crystals, the optical beam reflects back into the laser projector 84 as part of its optical receiver and the controller 56 then determines exactly the height in the two directions for the work table 78.

This is a technical reason both work tables 78 are required to be perfectly level to within thousandths of an inch and this facilitates programming for slab processing on the work tables, since there is one origin for both work tables, thus requiring only one calibration for two work tables, and not two separate calibrations. It is possible to use four crystals at the corner of each work table 78 and that may be required on larger jumbo work tables. In that case, each work table may require its own laser projector 84.

In an example of processing on the work tables 78, the vacuum pods 26 are located on the work table, and in an example, the vacuum pods have a top surface raised 150 millimeters. It is known where to place the vacuum pods for slab processing because the crystals are calibrated such that the work tables 78 are at the proper level. The location of the vacuum pods 26 and the height of the vacuum pods is 150 millimeters in a non-limiting example. There may be a setting on the machine 20 that indicates 150 millimeters and the laser projector will begin to project 150 millimeters above the work table 78, which is the reference. If a slab 24, e.g., a piece of granite is 1⅜ inches thick, then the 1⅜ inches thickness is added to 150 millimeters to change the projection position and accurately position the slab with reference to the 0, 0 point of the work table 78. In one non-limiting example, the laser projector 84 works with both work tables 78 to position slab pieces properly while the machine 20 is processing a slab at one work table, which the other work table is being set up for other processing of a slab.

Different CNC formats may be supported using different laser protecting software, such as DXF, where contours may be transferred directly to the laser via the controller 56 and its machine control for cutting, routing, edging and finishing according to preprogrammed routines defined by the initial work cutout and the mirror image slab cut layout. Interface communication connections may include the RS232, optical fiber, RS485, or other network connections such as IPX/XPF, TCB/IP with each session able to control multiple laser projectors 84, if needed. The laser projector 84 may be mounted at different locations on the frame 28 or separate on a work stand or ceiling mount to ensure a line laser covers the entire work table 78, including dual work tables. It can be mounted on a rotatable block mount as part of the frame 100 and even on the bridge 36 or carriage 38. Wavelengths for the laser may vary from about 635 nanometers to about 830 nanometers, and in another example, from about 405 nanometers to 830 nanometers or other ranges therebetween.

The controller 56 may incorporate a computer system that processes data in accordance with one or more instructions and includes one or more processors and memory such as both RAM and ROM for storing data. The controller 56 may be a personal computer, high end workstation, a mainframe, one or more servers, a cloud based system, or small handheld device in non-limiting examples. The controller 56 may incorporate several computers, on the other hand, controlling the at least one drive mechanism 100, such as respective individual motors, etc. The controller 56 not only controls the different electric motors, actuators, stepper motors, servomotors, and other machine components, but also processes any digital images (FIGS. 14 and 15) using an appropriate CAD program, including for example, Slabsmith, and may process image data and issue commands to the machine 20.

The controller 56 may include an image data conversion program as software that converts image data such as the CAD DXF file, in an example, into the appropriate control signals for instructing the CNC slab processing machine 20 and different actuators, motors, etc. to move the machining head 46 in the appropriate directions along the five X, Y, Z, A and C axes. It is possible that externally-generated digital image files may be stored in a memory of the controller 56. Other image files may be transmitted to the controller 56 via a local area or wide area network and wired or wireless connections or via other network routes.

The CAD program may store data in layers and blocks of data that include not only a countertop outline, but an outline for a sink hole 70, i.e., opening, faucet cut-outs, sink anchor holes 127, and other structures and features in a countertop or other cut slab. In order to ensure proper positioning and cutting, the CNC processing machine 20 includes the smooth work surface as the work table 78 on which the slab 24 is positioned upside down on the vacuum pods 26, such as an accurately milled, engineered, and polished quartz or similar surface described above. Similar processing used for the slab 24 may be used to produce the flat polished surface of the work table 78.

Digital images 134 of different slabs 24, including the top polished face 24*a* with different aesthetic vein characteristics of different slabs may be stored within a database associated with the controller 56. Different slab cut layout 152 files may be stored, several for an individual slab 24. The digital image 134 of a top polished face 24*a* of the slab 24 may include dimensional and material details about the stone slab and data related to its storage, including a unique identifier, the date/time it was stored, the dimensional relationships, including the thickness, length and width as a rough cut slab, color characteristics, possible purchaser information, and other customer and commercial data related to the slab.

Many types of cameras 144 may be used to take a digital image 134 of the slab 24, including the top polished face 24*a* of the slab and any adhered reference markers 82. A camera 144 may be incorporated into a manufacturing line and images may be taken when the slab is positioned off-table from the CNC slab processing machine 20. The camera 144 may be a visible light camera, infrared camera, 3D scanning device, time-of-flight camera, structured light scanner, or stereoscopic scanner. The camera 144 may take 2D and 3D images depending on configuration.

Any imaging device 130 as a display may include a user interface menu that allows user selection via a mouse or other input device, including a keyboard, to toggle between different viewing angles or vantage points and input data related to the slab and cut layouts. The stone slab 24 may be a molded stone slab or formed from particulate mineral material that may be mixed with pigments and a resin binder and compressed to form a hardened slab. The stone slab may be cut to specific shapes for a countertop, table, floor, or similar end uses. The aesthetic effect of the top polished face 24*a* of the stone slab 24 includes the veins 150 (FIGS. 15 and 16) that may extend the complete length of the stone slab and through all or part of the thickness of a stones slab, and provide the natural vein appearance even when the slab is cut and edged to specific shapes. The initial digital image 134 of the slab 24, such as its top polished face 24*a*, will show the perceptible characteristics and veins.

Different unique identifiers for a stone slab may include a label, bar code, RFID tag, QR code, or etching and writing directly on the stone slab an identifier. Any digital image 134 of the stone slab 24 may have a predetermined dimensional relationship and the ratio of stone slab unit lengths per image pixel may extend less than 0.001 inch per pixel up to 0.02 inch per pixel. This small pixel ratio may allow a distortion free image to be shown. Thus, a digital image 134 of the top polished face 24*a* may provide a reliable image and tool to overlay a slab cut layout on the digital image and provide a known relationship that facilitates a high degree of precision for slab visualization when generating the slab cut layout.

Figure 21:
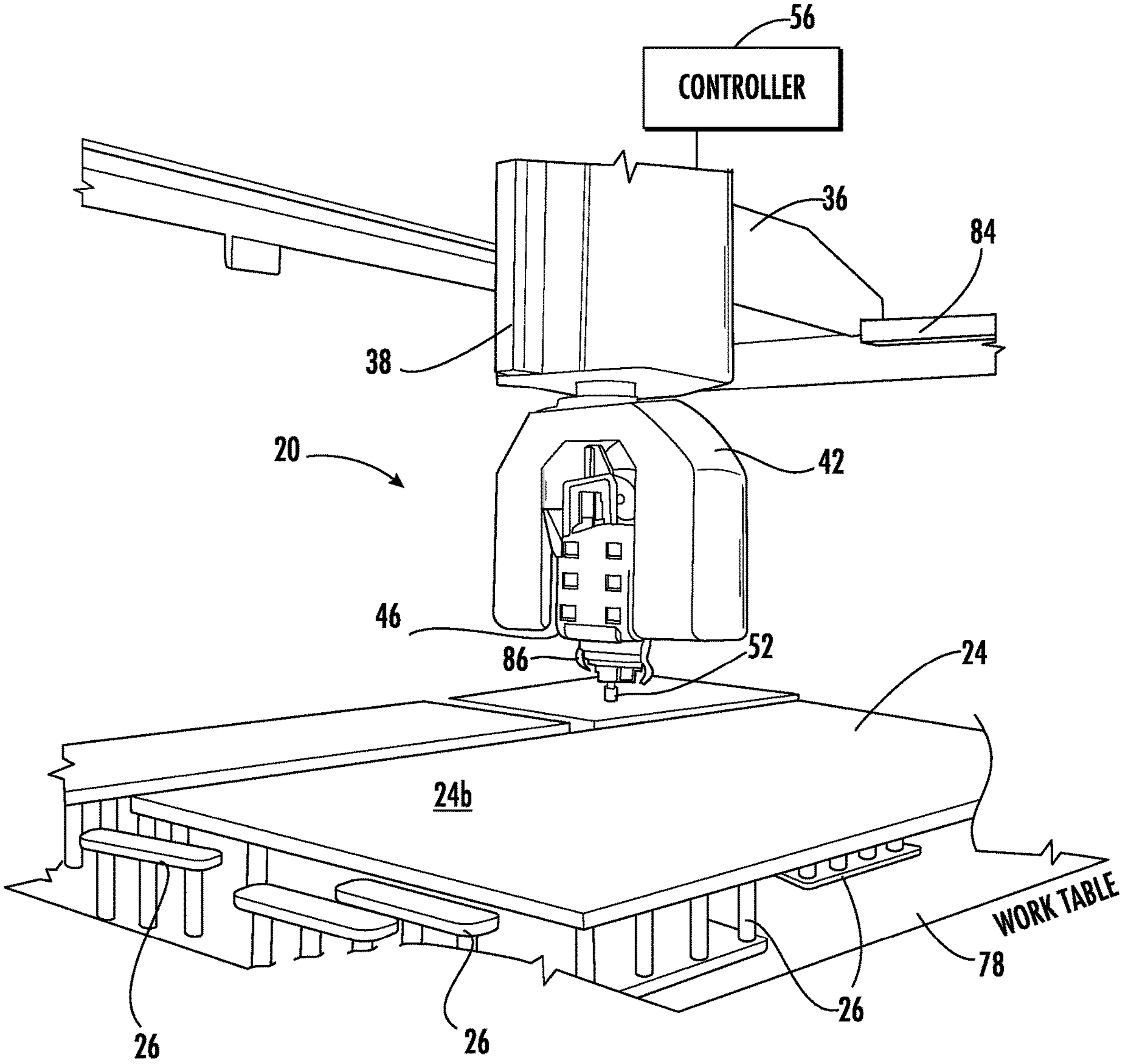
FIG. 21 is another image of the machine of FIG. 20 showing the cut stone slab.

Referring now to FIGS. 20 and 21, schematic, isometric diagrams of the machine 20 are illustrated showing an example of cutting (FIG. 20). A coupling for a mounting cone 51 is configured in the example of FIG. 20 to mount the circular saw blade 80 to the spindle 50. In the example of FIG. 21, the circular saw blade 80 has been switched out and a new mounting or coupling cone 51 inserted that includes finger bit 52. The machining head has been rotated back on the "A-axis" and the spindle 50 vertically oriented. The cutting tool such as the finger bit 52 may be inserted for cutting out a sink hole 70 or cutting the edges of the sink or another tool mounted for finishing. In the example in FIG. 21, the slab has been cut into three pieces, which may be further processed. The three pieces of slab 20 may have been cut using the circular saw blade 80 as shown in FIG. 20 or cut by the finger bit 52 in a routing process. This view helps illustrate the diversity of the machine 20. It is possible that a circular saw blade 80 may be used to cut large radius circles or curves for a sink hole 70 or other features, or a finger bit 52 used. The machine 20 is versatile as described.

Figure 22:
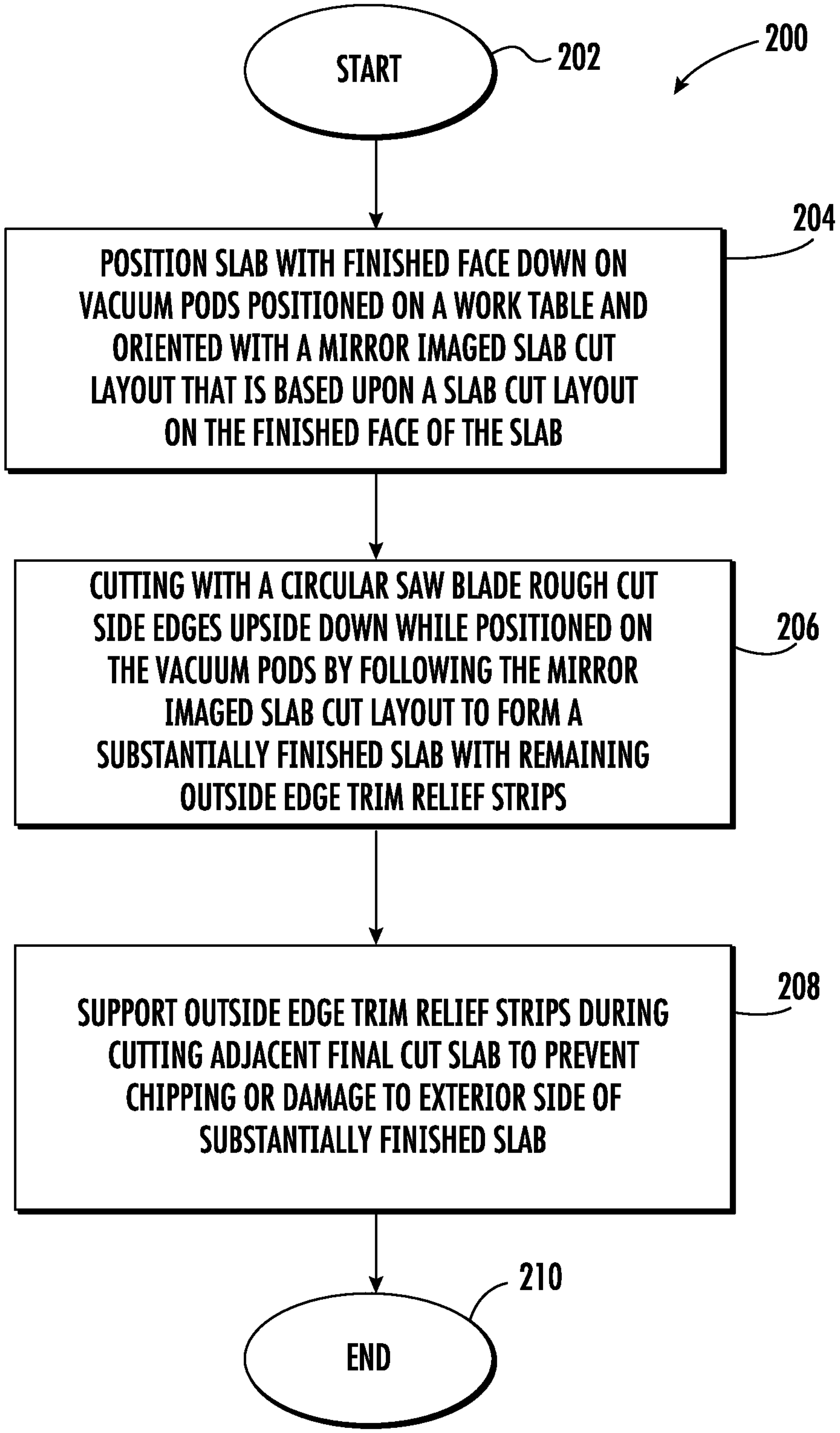
FIG. 22 is a high-level flow diagram of the stone slab processing that includes supporting the outside edge trim relief strips.

Referring now to FIG. 22, there is illustrated a high-level flowchart shown generally at 200 of a method of processing a stone or stone-like slab 24 by cutting with the finished face down, and in an example, supporting with the relief supports 104 the outside edge trim relief strips.

The process starts (Block 202) and the slab is positioned with the finished face down on vacuum pods 26 positioned on a work table 78 and oriented with a mirror image slab cut layout that is based upon a slab cut layout 152 on the finished face 24*a* of the slab (Block 204). The slab 24 is cut with a circular saw blade 80 along the rough cut side edges upside down while positioned on the vacuum pods 26 by following the mirror image slab cut layout, such as by following laser lines or a controlled program, to form a substantially finished slab with the remaining outside edge trim relief strips being cut (Block 206). The outside edge trim relief strips produced from cutting the peripheral side edges of the slab are supported during cutting adjacent the final cut slab to prevent chipping or damage to the exterior side of the substantially finished slab (Block 208). The process ends (Block 210).

Figure 23:
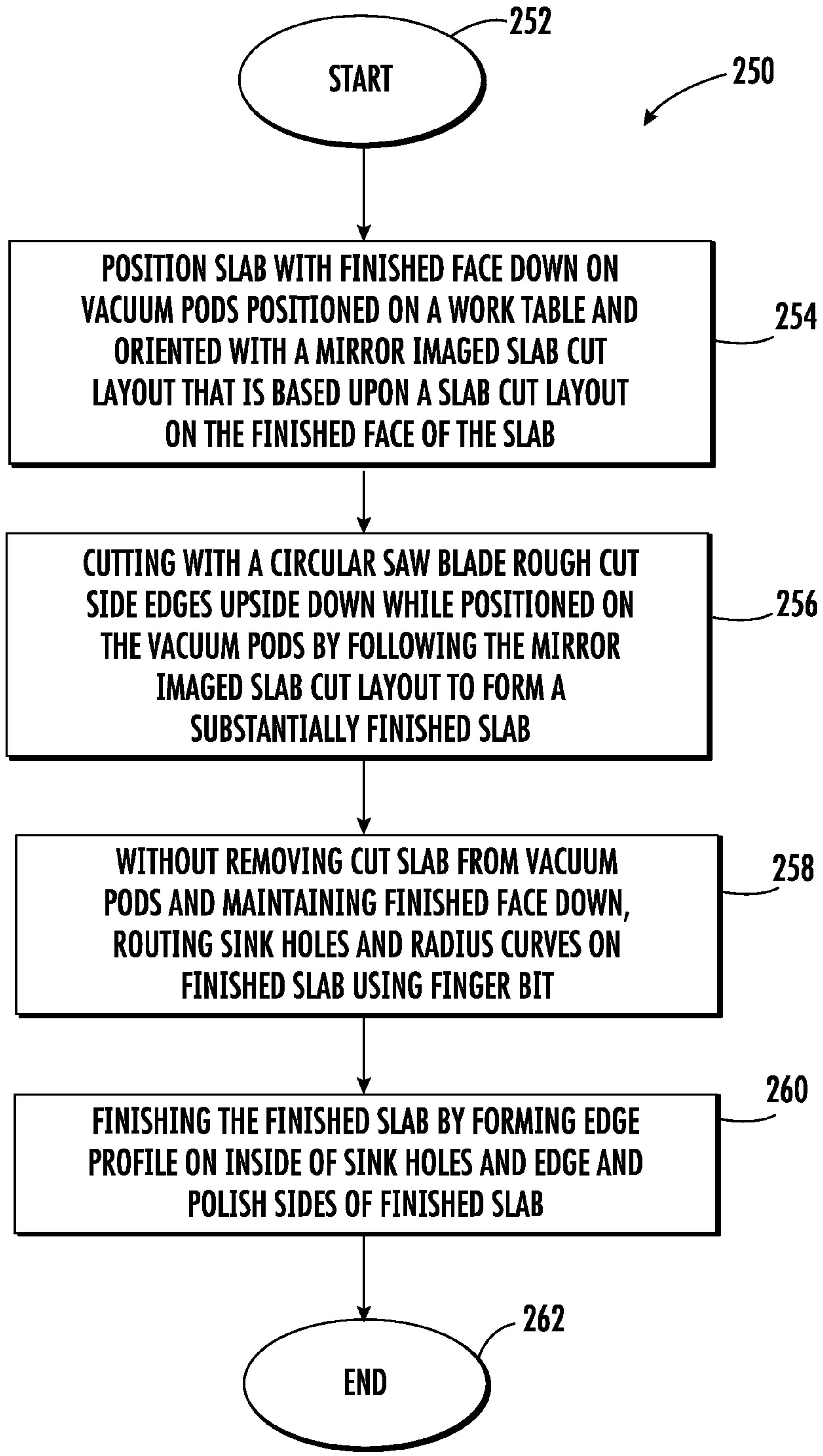
FIG. 23 is a high-level flow diagram of the stone slab processing that includes finishing of the slab.

Referring now to FIG. 23 there is illustrated a high-level flowchart shown generally at 250 of a method of processing a stone or stone-like slab 24 with the hybrid processing as described above. The process starts (Block 252) and the slab 24 is positioned with the finished face 24*a* down on vacuum pods 26 and oriented with the mirror image slab cut layout that is based upon a slab cut layout 152 on the finished face of the slab (Block 254). The slab 24 is cut with the circular saw blade 80 against the rough cut side edges upside down while positioned on the vacuum pods 26 by following the mirror image slab cut layout to form a substantially finished slab (Block 256). Without removing the cut slab from the vacuum pods 26 and maintaining the finished face down, sink holes 70 may be routed and radius curves formed on the finished slab using the finger bit 52 as an example (Block 258). The slab 24 is finished by forming an edge profile on the inside of the sink holes 70 and followed by edging and polish the sides of finished slab (Block 260). The process ends (Block 262).

This application is related to copending patent applications entitled, "MACHINE FOR CUTTING A SLAB WITH FINISHED FACE DOWN AND RELATED METHOD," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method of processing a stone slab having rough cut side edges and a finished face and bottom surface, comprising:

positioning the slab with the finished face down on vacuum pods positioned on a work table and oriented with a mirror imaged slab cut layout that is based upon a slab cut layout on the finished face of the slab;

cutting with a circular saw blade mounted on a spindle the side edges of the slab upside down by following the mirror imaged slab cut layout to form a slab corresponding substantially to the shape of a countertop; and without removing the cut slab from the vacuum pods and maintaining the finished face down, routing any sink holes and any radius curves on the finished slab piece using a finger bit that had been switched onto the spindle after removal of the circular saw blade, the routing path based upon the mirror imaged slab cut layout, and finishing the slab by forming an edge profile on the inside of any sink holes and edging and polishing the sides of the finished slab.

2. The method of claim 1 comprising:

generating a digital slab cut layout file containing digital data representative of the cut layout on the finished face of the slab; and mirror imaging the digital slab cut layout file to form the mirror imaged slab cut layout.

3. The method of claim 2 comprising laser projecting towards the work table the mirror imaged slab cut layout to aid in positioning the slab for mirror image cutting with the finished face down on the vacuum pods.

4. The method of claim 3 comprising:

overlaying a slab cut layout on a digital image of the finished face of the slab;

generating a Drawing Exchange Format (DXF) file containing digital data containing digital data representative of the finished face and its slab cut layout referenced to reference markers adhered on the rough cut side edges of the slab;

mirror imaging the DXF file; and laser projecting the mirror imaged locations of the reference markers.

5. The method of claim 1 comprising supporting a finger bit in a machining head that is rotatably mounted between support arms of a machine yoke and configured for A-axis rotation, the method further comprising rotating the machine yoke about a C-axis and maintaining a support arm leading along the path of advancement of the finger bit to relieve stress on the A-axis when routing any sink holes and radius curves.

6. The method of claim 1 comprising switching out the finger bit with at least one finishing tool for forming the edge profile and edging and polishing the sides of the finished slab piece.

7. The method of claim 1 comprising routing sink anchor holes while the cut slab in positioned on the vacuum pods, said sink anchor holes configured to receive anchors for sink mounting.

8. The method of claim 1 wherein the work table comprises a quartz slab.

* * * * *